US012614795B2

(12) United States Patent
Isaka et al.

(10) Patent No.: US 12,614,795 B2
(45) **Date of Patent: \*Apr. 28, 2026**

(54) POWER STORAGE ASSEMBLY AND GASKET

(71) Applicant: DAIKIN INDUSTRIES, LTD., Osaka (JP)

(72) Inventors: Tadaharu Isaka, Osaka (JP); Hayato Tsuda, Osaka (JP); Yumi Zenke, Osaka (JP); Yukari Yamamoto, Osaka (JP); Takahisa Aoyama, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 690 days.

This patent is subject to a terminal disclaimer.

(21) Appl. No.: 17/679,831

(22) Filed: Feb. 24, 2022

(65) Prior Publication Data

US 2022/0181729 A1      Jun. 9, 2022

Related U.S. Application Data

(63) Continuation of application No. PCT/JP2020/032239, filed on Aug. 26, 2020.

(30) Foreign Application Priority Data

Aug. 26, 2019   (JP) ................................ 2019-153773
Mar. 6, 2020   (JP) ................................ 2020-038592

(Continued)

(51) Int. Cl.
*H01M 50/193*      (2021.01)
*H01M 50/188*      (2021.01)

(52) U.S. Cl.
CPC ....... *H01M 50/193* (2021.01); *H01M 50/188* (2021.01)

(58) Field of Classification Search
CPC .......................... H01M 50/193; H01M 50/188
See application file for complete search history.

(56) References Cited

U.S. PATENT DOCUMENTS 3,635,926 A      1/1972   Gresham et al.
3,945,786 A      3/1976   Bishop
(Continued)

FOREIGN PATENT DOCUMENTS

CN              1599757 A      3/2005
CN           103946250 A      7/2014
(Continued)

OTHER PUBLICATIONS

International Search Report issued Oct. 13, 2020 in International Application No. PCT/JP2020/032236.

(Continued)

*Primary Examiner* — James Lee
(74) *Attorney, Agent, or Firm* — Sughrue Mion, PLLC

(57) ABSTRACT

A power storage assembly having a gasket containing a copolymer containing a tetrafluoroethylene unit and a fluoro (alkyl vinyl ether) unit, wherein the copolymer has a content of the fluoro(alkyl vinyl ether) unit of 2.0 to 6.0% by mass with respect to the whole of the monomer units, a melt flow rate of 0.5 to 55 g/10 min, and the number of functional groups of 50 or less per $10^6$ main-chain carbon atoms.

13 Claims, 5 Drawing Sheets

(30) Foreign Application Priority Data

Mar. 6, 2020 (JP) ................................ 2020-038598
Mar. 6, 2020 (JP) ................................ 2020-038601

(56) References Cited

U.S. PATENT DOCUMENTS

| | | | |
|---|---|---|---|
| 4,029,868 | A | 6/1977 | Carlson |
| 4,262,101 | A | 4/1981 | Hartwimmer et al. |
| 4,414,356 | A | 11/1983 | Michel |
| 4,510,300 | A | 4/1985 | Levy |
| 4,743,658 | A | 5/1988 | Imbalzano et al. |
| 4,902,444 | A | 2/1990 | Kolouch |
| 5,000,875 | A | 3/1991 | Kolouch |
| 5,656,392 | A | 8/1997 | Sano et al. |
| 5,767,198 | A | 6/1998 | Shimizu et al. |
| 5,851,693 | A | 12/1998 | Sano et al. |
| 6,066,707 | A | 5/2000 | Colaianna et al. |
| 6,069,215 | A | 5/2000 | Araki et al. |
| 6,096,795 | A | 8/2000 | Abusleme et al. |
| 6,689,833 | B1 | 2/2004 | Bidstrup et al. |
| 6,713,183 | B2 | 3/2004 | Araki et al. |
| 6,740,375 | B1 | 5/2004 | Sagisaka et al. |
| 6,774,196 | B1 | 8/2004 | Taira et al. |
| 11,826,975 | B2 | 11/2023 | Imamura et al. |
| 2002/0011692 | A1 | 1/2002 | Lahijani |
| 2002/0099143 | A1 | 7/2002 | Namura |
| 2002/0167115 | A1 | 11/2002 | Tanaka |
| 2003/0013791 | A1 | 1/2003 | Blong et al. |
| 2003/0109646 | A1 | 6/2003 | Kubo et al. |
| 2003/0114615 | A1 | 6/2003 | Sumi et al. |
| 2003/0190530 | A1 | 10/2003 | Yang et al. |
| 2003/0216531 | A1 | 11/2003 | Aten et al. |
| 2004/0072935 | A1 | 4/2004 | Blong et al. |
| 2004/0102572 | A1 | 5/2004 | Kubo et al. |
| 2004/0204536 | A1 | 10/2004 | Miyatani et al. |
| 2004/0260044 | A1 | 12/2004 | Earnest, Jr. et al. |
| 2005/0020792 | A1 | 1/2005 | Aoyama et al. |
| 2005/0245626 | A1 | 11/2005 | Hoaglund et al. |
| 2007/0112155 | A1 | 5/2007 | Takase et al. |
| 2007/0149734 | A1 | 6/2007 | Sakakibara et al. |
| 2007/0281166 | A1 | 12/2007 | Nishio |
| 2007/0292685 | A1 | 12/2007 | Brothers et al. |
| 2008/0038627 | A1 | 2/2008 | Yamauchi et al. |
| 2008/0114143 | A1 | 5/2008 | Brothers et al. |
| 2008/0241534 | A1 | 10/2008 | Ohtani et al. |
| 2009/0038821 | A1 | 2/2009 | Sato et al. |
| 2009/0044965 | A1 | 2/2009 | Kono et al. |
| 2009/0176952 | A1 | 7/2009 | Funaki et al. |
| 2009/0246435 | A1 | 10/2009 | Shimono et al. |
| 2010/0063214 | A1 | 3/2010 | Kasahara et al. |
| 2010/0212929 | A1 | 8/2010 | Ishii et al. |
| 2010/0273047 | A1 | 10/2010 | Kunoike et al. |
| 2010/0314153 | A1 | 12/2010 | Ishii et al. |
| 2010/0314154 | A1 | 12/2010 | Kitahara et al. |
| 2011/0052970 | A1 | 3/2011 | Kurata et al. |
| 2011/0052977 | A1 | 3/2011 | Kurata et al. |
| 2011/0104562 | A1 | 5/2011 | Byun et al. |
| 2011/0203830 | A1 | 8/2011 | Kono et al. |
| 2011/0272173 | A1 | 11/2011 | Shiotsuki et al. |
| 2012/0035329 | A1 | 2/2012 | Isogai et al. |
| 2012/0064273 | A1 | 3/2012 | Bacino |
| 2012/0094169 | A1* | 4/2012 | Kim ..................... H01M 50/119 |
| | | | 429/164 |
| 2013/0046058 | A1 | 2/2013 | Pham et al. |
| 2013/0130100 | A1 | 5/2013 | Kurata et al. |
| 2014/0227533 | A1 | 8/2014 | Murakami et al. |
| 2014/0287177 | A1 | 9/2014 | Suda et al. |
| 2014/0378616 | A1 | 12/2014 | Nakano et al. |
| 2015/0041145 | A1 | 2/2015 | Colaianna et al. |
| 2015/0148481 | A1 | 5/2015 | Brothers et al. |
| 2015/0158988 | A1 | 6/2015 | Sawaki et al. |
| 2015/0353700 | A1 | 12/2015 | Isaka et al. |
| 2016/0006004 | A1 | 1/2016 | Ogawa et al. |
| 2016/0078979 | A1 | 3/2016 | Hosoda et al. |
| 2016/0108159 | A1 | 4/2016 | Sekiguchi et al. |
| 2016/0194491 | A1 | 7/2016 | Taguchi et al. |
| 2016/0272805 | A1 | 9/2016 | Nakanishi et al. |
| 2016/0319089 | A1 | 11/2016 | Imamura et al. |
| 2016/0322128 | A1 | 11/2016 | Imamura et al. |
| 2017/0008986 | A1 | 1/2017 | Isaka et al. |
| 2017/0025204 | A1 | 1/2017 | Chapman et al. |
| 2017/0154707 | A1 | 6/2017 | Abe et al. |
| 2017/0214037 | A1 | 7/2017 | Uematsu et al. |
| 2017/0260344 | A1 | 9/2017 | Imamura et al. |
| 2018/0009204 | A1 | 1/2018 | Higuchi et al. |
| 2018/0036931 | A1 | 2/2018 | Higuchi et al. |
| 2018/0237566 | A1 | 8/2018 | Aida et al. |
| 2018/0265654 | A1 | 9/2018 | Imamura et al. |
| 2018/0283590 | A1 | 10/2018 | Yokoyama et al. |
| 2019/0134939 | A1 | 5/2019 | Colaianna et al. |
| 2019/0143628 | A1 | 5/2019 | Colaianna et al. |
| 2019/0177453 | A1 | 6/2019 | Isaka et al. |
| 2019/0193315 | A1 | 6/2019 | Miyamoto et al. |
| 2019/0375929 | A1 | 12/2019 | Nishimura et al. |
| 2019/0382544 | A1 | 12/2019 | Yokotani et al. |
| 2020/0332037 | A1 | 10/2020 | Isaka et al. |
| 2021/0008827 | A1 | 1/2021 | Colaianna et al. |
| 2021/0008828 | A1 | 1/2021 | Colaianna et al. |
| 2021/0024709 | A1 | 1/2021 | Fukushima et al. |
| 2021/0024769 | A1 | 1/2021 | Imamura et al. |
| 2021/0189031 | A1 | 6/2021 | Hintzer et al. |
| 2021/0269568 | A1 | 9/2021 | Imamura et al. |
| 2022/0001657 | A1 | 1/2022 | Kikuchi et al. |
| 2022/0033636 | A1 | 2/2022 | Nishimura et al. |
| 2022/0170573 | A1 | 6/2022 | Imamura et al. |
| 2022/0181689 | A1 | 6/2022 | Isaka et al. |
| 2022/0181698 | A1 | 6/2022 | Isaka et al. |
| 2022/0195088 | A1 | 6/2022 | Imamura et al. |
| 2022/0213996 | A1 | 7/2022 | Imamura et al. |
| 2022/0266485 | A1 | 8/2022 | Tsuda et al. |
| 2022/0278403 | A1 | 9/2022 | Isaka et al. |
| 2023/0227594 | A1 | 7/2023 | Yamamoto et al. |
| 2023/0235107 | A1 | 7/2023 | Isaka et al. |
| 2023/0235159 | A1 | 7/2023 | Isaka et al. |
| 2023/0235160 | A1 | 7/2023 | Isaka et al. |
| 2023/0238627 | A1 | 7/2023 | Isaka et al. |
| 2023/0238628 | A1 | 7/2023 | Zenke et al. |
| 2023/0238629 | A1 | 7/2023 | Isaka et al. |
| 2023/0272136 | A1 | 8/2023 | Zenke et al. |
| 2023/0295356 | A1 | 9/2023 | Isaka et al. |
| 2023/0344077 | A1 | 10/2023 | Qiu et al. |
| 2023/0383031 | A1 | 11/2023 | Isaka et al. |
| 2023/0383032 | A1 | 11/2023 | Isaka et al. |
| 2023/0383033 | A1 | 11/2023 | Zenke et al. |
| 2023/0383034 | A1 | 11/2023 | Isaka et al. |
| 2023/0390977 | A1 | 12/2023 | Hamada et al. |
| 2023/0390978 | A1 | 12/2023 | Tsuda et al. |
| 2023/0390979 | A1 | 12/2023 | Tsuda et al. |
| 2023/0390980 | A1 | 12/2023 | Tsuda et al. |
| 2023/0390981 | A1 | 12/2023 | Tsuda et al. |
| 2023/0391909 | A1 | 12/2023 | Isaka et al. |
| 2023/0391910 | A1 | 12/2023 | Isaka et al. |
| 2023/0391911 | A1 | 12/2023 | Isaka et al. |
| 2023/0391912 | A1 | 12/2023 | Isaka et al. |
| 2023/0391917 | A1 | 12/2023 | Isaka et al. |
| 2023/0391920 | A1 | 12/2023 | Isaka et al. |
| 2023/0391927 | A1 | 12/2023 | Isaka |
| 2023/0391929 | A1 | 12/2023 | Isaka et al. |
| 2023/0391931 | A1 | 12/2023 | Isaka et al. |
| 2023/0391932 | A1 | 12/2023 | Isaka et al. |
| 2023/0391933 | A1 | 12/2023 | Isaka et al. |
| 2023/0392737 | A1 | 12/2023 | Tsuda et al. |
| 2023/0395282 | A1 | 12/2023 | Isaka et al. |
| 2023/0399431 | A1 | 12/2023 | Isaka et al. |
| 2023/0399432 | A1 | 12/2023 | Isaka et al. |
| 2023/0399438 | A1 | 12/2023 | Isaka et al. |
| 2023/0399441 | A1 | 12/2023 | Isaka et al. |
| 2023/0399443 | A1 | 12/2023 | Isaka et al. |
| 2023/0406975 | A1 | 12/2023 | Isaka et al. |
| 2023/0406976 | A1 | 12/2023 | Isaka et al. |
| 2023/0411751 | A1 | 12/2023 | Tsuda et al. |
| 2023/0415387 | A1 | 12/2023 | Hamada et al. |
| 2025/0002728 | A1 | 1/2025 | Zenke et al. |
| 2025/0011488 | A1 | 1/2025 | Isaka et al. |

(56)  References Cited

U.S. PATENT DOCUMENTS

| | | |
|---|---|---|
| 2025/0011490 A1 | 1/2025 | Isaka et al. |
| 2025/0011494 A1 | 1/2025 | Isaka et al. |
| 2025/0011496 A1 | 1/2025 | Yamamoto et al. |
| 2025/0011498 A1 | 1/2025 | Isaka et al. |
| 2025/0011499 A1 | 1/2025 | Isaka et al. |
| 2025/0011500 A1 | 1/2025 | Isaka et al. |
| 2025/0019476 A1 | 1/2025 | Isaka et al. |
| 2025/0034302 A1 | 1/2025 | Isaka et al. |

FOREIGN PATENT DOCUMENTS

| | | |
|---|---|---|
| CN | 107428144 A | 12/2017 |
| CN | 109476061 A | 3/2019 |
| CN | 110712348 A | 1/2020 |
| CN | 110790854 A | 2/2020 |
| CN | 114223086 A | 3/2022 |
| CN | 114258609 A | 3/2022 |
| CN | 116390957 A | 7/2023 |
| CN | 116867821 A | 10/2023 |
| CN | 116917346 A | 10/2023 |
| EP | 0 220 910 A2 | 5/1987 |
| EP | 0 423 995 A1 | 4/1991 |
| EP | 0 976 544 A1 | 2/2000 |
| EP | 1 462 458 A1 | 9/2004 |
| EP | 3 816 214 A1 | 5/2021 |
| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 62-53019 B2 | 11/1987 |
| JP | 1-53167 B2 | 11/1989 |
| JP | 2-129253 A | 5/1990 |
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |
| JP | 9-245832 A | 9/1997 |
| JP | 10-87746 A | 4/1998 |
| JP | 10-158456 A | 6/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-56079 A | 3/2010 |
| JP | 2010-509443 A | 3/2010 |
| JP | 2010-85741 A | 4/2010 |
| JP | 2010-162817 A | 7/2010 |
| JP | 2010-235667 A | 10/2010 |
| JP | 2011-48976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-514598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2013-0069652 A1 | 6/2013 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2019/187725 A1 | 10/2019 |
| WO | 2019/189316 A1 | 10/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021039864 A1 | 3/2021 |
| WO | 2021/059753 A1 | 4/2021 |
| WO | 2022/181225 A1 | 9/2022 |

(56) References Cited

FOREIGN PATENT DOCUMENTS

WO    2022/181231 A1    9/2022
WO    2022/181232 A1    9/2022

OTHER PUBLICATIONS

International Search Report issued Oct. 13, 2020 in International Application No. PCT/JP2020/032237.
International Search Report issued Oct. 13, 2020 in International Application No. PCT/JP2020/032238.
International Search Report issued Oct. 13, 2020 in International Application No. PCT/JP2020/032239.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
U.S. Appl. No. 17/679,789, filed Feb. 24, 2022, Isaka, et al., cont of PCT/JP2020/032238.
U.S. Appl. No. 17/679,818, filed Feb. 24, 2022, Isaka, et al., cont of PCT/JP2020/032236.
U.S. Appl. No. 17/679,765, filed Feb. 24, 2022, Isaka, et al., cont of PCT/JP2020/032237.
U.S. Appl. No. 17/680,911, filed Feb. 25, 2022, Tsuda, et al., cont of PCT/JP2020/032234.
U.S. Appl. No. 18/191,412, filed Mar. 28, 2023, Isaka, et al., cont of PCT/JP2021/036301.
U.S. Appl. No. 18/191,461, filed Mar. 28, 2023, Zenke, et al., cont of PCT/JP2021/036302.
U.S. Appl. No. 18/192,020, filed Mar. 29, 2023, Isaka, et al., cont of PCT/JP2021/036303.
U.S. Appl. No. 18/192,053, filed Mar. 29, 2023, Isaka, et al., cont of PCT/JP2021/036304.
U.S. Appl. No. 18/192,101, filed Mar. 29, 2023, Yamamoto, et al., cont of PCT/JP2021/036305.
U.S. Appl. No. 18/191,996, filed Mar. 29, 2023, Tsuda, et al., cont of PCT/JP2021/036306.
U.S. Appl. No. 18/192,052, filed Mar. 29, 2023, Zenke, et al., cont of PCT/JP2021/036307.
U.S. Appl. No. 18/192,011, filed Mar. 29, 2023, Isaka, et al., cont of PCT/JP2021/036308.
U.S. Appl. No. 18/192,077, filed Mar. 29, 2023, Isaka, et al., cont of PCT/JP2021/036309.

U.S. Appl. No. 18/192,298, filed Mar. 29, 2023, Isaka, et al., cont of PCT/JP2021/036310.
U.S. Appl. No. 18/453,775, filed Aug. 22, 2023, Tsuda, et al., cont of PCT/JP2022/007735.
U.S. Appl. No. 18/453,690, filed Aug. 22, 2023, Tsuda, et al., cont of PCT/JP2022/007737.
U.S. Appl. No. 18/452,806, filed Aug. 21, 2023, Tsuda, et al., cont of PCT/JP2022/007738.
U.S. Appl. No. 18/450,642, filed Aug. 16, 2023, Isaka, et al., cont of PCT/JP2022/003634.
U.S. Appl. No. 18/448,291, filed Aug. 11, 2023, Isaka, et al., cont of PCT/JP2022/003635.
U.S. Appl. No. 18/449,061, filed Aug. 14, 2023, Isaka, et al., cont of PCT/JP2022/003636.
U.S. Appl. No. 18/448,234, filed Aug. 11, 2023, Isaka, et al., cont of PCT/JP2022/003637.
U.S. Appl. No. 18/453,363, filed Aug. 22, 2023, Isaka, et al., cont of PCT/JP2022/003638.
U.S. Appl. No. 18/449,788, filed Aug. 15, 2023, Isaka, et al., cont of PCT/JP2022/003640.
U.S. Appl. No. 18/451,502, filed Aug. 17, 2023, Isaka, et al., cont of PCT/JP2022/003641.
U.S. Appl. No. 18/450,590, filed Aug. 16, 2023, TSUDA, et al., cont of PCT/JP2022/003642.
U.S. Appl. No. 18/450,094, filed Aug. 15, 2023, Hamada, et al., cont of PCT/JP2022/003643.
U.S. Appl. No. 18/449,845, filed Aug. 15, 2023, Zenke, et al., cont of PCT/JP2022/003644.
U.S. Appl. No. 18/446,746, filed Aug. 9, 2023, Isaka, et al., cont of PCT/JP2022/003645.
U.S. Appl. No. 18/450,491, filed Aug. 16, 2023, Isaka, et al., cont of PCT/JP2022/003646.
U.S. Appl. No. 18/451,525, filed Aug. 17, 2023, Isaka, et al., cont of PCT/JP2022/003647.
U.S. Appl. No. 18/451,455, filed Aug. 17, 2023, Isaka, et al., cont of PCT/JP2022/003468.
U.S. Appl. No. 18/452,107, filed Aug. 18, 2023, Isaka, et al., cont of PCT/JP2022/003649.
U.S. Appl. No. 18/452,146, filed Aug. 18, 2023, Isaka, et al., cont of PCT/JP2022/003650.
U.S. Appl. No. 18/448,341, filed Aug. 11, 2023, Isaka, et al., cont of PCT/JP2022/003651.
U.S. Appl. No. 18/449,778, filed Aug. 15, 2023, Isaka, et al., cont of PCT/JP2022/003652.
U.S. Appl. No. 18/447,877, filed Aug. 10, 2023, Isaka, et al., cont of PCT/JP2022/003653.
U.S. Appl. No. 18/452,908, filed Aug. 21, 2023, Isaka, et al., cont of PCT/JP2022/003654.
U.S. Appl. No. 18/454,141, filed Aug. 23, 2023, Isaka, et al., cont of PCT/JP2022/003657.
U.S. Appl. No. 18/453,709, filed Aug. 22, 2023, Isaka, et al., cont of PCT/JP2022/003658.
U.S. Appl. No. 18/452,769, filed Aug. 21, 2023, Isaka, et al., cont of PCT/JP2022/003659.
U.S. Appl. No. 18/453,810, filed Aug. 22, 2023, Tsuda, et al., cont of PCT/JP2022/003660.
U.S. Appl. No. 18/450,568, filed Aug. 16, 2023, Hamada, et al., cont of PCT/JP2022/003661.
U.S. Appl. No. 18/453,683, filed Aug. 22, 2023, Isaka, et al., cont of PCT/JP2022/003664.
U.S. Appl. No. 18/454,133, filed Aug. 23, 2023, Isaka, et al., cont of PCT/JP2022/003665.
International Search Report issued Oct. 6, 2020 in International Application No. PCT/JP2020/032234.
International Preliminary Report on Patentability, with Translation of Written Opinion issued Mar. 1, 2022 in International Application No. PCT/JP2020/032238.
International Preliminary Report on Patentability, with Translation of Written Opinion issued Mar. 1, 2022 in International Application No. PCT/JP2020/032239.
International Preliminary Report on Patentability, with Translation of Written Opinion issued Mar. 1, 2022 in International Application No. PCT/JP2020/032236.

(56)        References Cited

OTHER PUBLICATIONS

International Preliminary Report on Patentability, with Translation of Written Opinion issued Mar. 1, 2022 in International Application No. PCT/JP2020/032237.
International Preliminary Report on Patentability, with Translation of Written Opinion issued Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.

Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
Extended European Search Report issued Aug. 2, 2023 in European Application No. 20857704.9.
International Preliminary Report on Patentability dated Aug. 29, 2023 with a Translation of the Written Opinion of the International Searching Authority in Application No. PCT/JP2022/003634.
International Preliminary Report on Patentability dated Aug. 29, 2023 with a Translation of the Written Opinion of the International Searching Authority in Application No. PCT/JP2022/003635.
International Preliminary Report on Patentability dated Aug. 29, 2023 with a Translation of the Written Opinion of the International Searching Authority in Application No. PCT/JP2022/003636.
International Preliminary Report on Patentability dated Aug. 29, 2023 with a Translation of the Written Opinion of the International Searching Authority in Application No. PCT/JP2022/003637.
International Preliminary Report on Patentability dated Aug. 29, 2023 with a Translation of the Written Opinion of the International Searching Authority in Application No. PCT/JP2022/003638.
International Preliminary Report on Patentability dated Aug. 29, 2023 with a Translation of the Written Opinion of the International Searching Authority in Application No. PCT/JP2022/003640.
International Preliminary Report on Patentability dated Aug. 29, 2023 with a Translation of the Written Opinion of the International Searching Authority in Application No. PCT/JP2022/003641.
International Preliminary Report on Patentability dated Aug. 29, 2023 with a Translation of the Written Opinion of the International Searching Authority in Application No. PCT/JP2022/003642.
International Preliminary Report on Patentability dated Aug. 29, 2023 with a Translation of the Written Opinion of the International Searching Authority in Application No. PCT/JP2022/003643.
International Preliminary Report on Patentability dated Aug. 29, 2023 with a Translation of the Written Opinion of the International Searching Authority in Application No. PCT/JP2022/003644.
International Preliminary Report on Patentability dated Aug. 29, 2023 with a Translation of the Written Opinion of the International Searching Authority in Application No. PCT/JP2022/003645.
International Preliminary Report on Patentability dated Aug. 29, 2023 with a Translation of the Written Opinion of the International Searching Authority in Application No. PCT/JP2022/003646.
International Preliminary Report on Patentability dated Aug. 29, 2023 with a Translation of the Written Opinion of the International Searching Authority in Application No. PCT/JP2022/003647.
International Preliminary Report on Patentability dated Aug. 29, 2023 with a Translation of the Written Opinion of the International Searching Authority in Application No. PCT/JP2022/003648.
International Preliminary Report on Patentability dated Aug. 29, 2023 with a Translation of the Written Opinion of the International Searching Authority in Application No. PCT/JP2022/003649.
International Preliminary Report on Patentability dated Aug. 29, 2023 with a Translation of the Written Opinion of the International Searching Authority in Application No. PCT/JP2022/003650.
International Preliminary Report on Patentability dated Aug. 29, 2023 with a Translation of the Written Opinion of the International Searching Authority in Application No. PCT/JP2022/003651.

(56) References Cited

OTHER PUBLICATIONS

International Preliminary Report on Patentability dated Aug. 29, 2023 with a Translation of the Written Opinion of the International Searching Authority in Application No. PCT/JP2022/003652.
International Preliminary Report on Patentability dated Aug. 29, 2023 with a Translation of the Written Opinion of the International Searching Authority in Application No. PCT/JP2022/003653.
International Preliminary Report on Patentability dated Aug. 29, 2023 with a Translation of the Written Opinion of the International Searching Authority in Application No. PCT/JP2022/003654.
International Preliminary Report on Patentability dated Aug. 29, 2023 with a Translation of the Written Opinion of the International Searching Authority in Application No. PCT/JP2022/003657.
International Preliminary Report on Patentability dated Aug. 29, 2023 with a Translation of the Written Opinion of the International Searching Authority in Application No. PCT/JP2022/003658.
International Preliminary Report on Patentability dated Aug. 29, 2023 with a Translation of the Written Opinion of the International Searching Authority in Application No. PCT/JP2022/003659.
International Preliminary Report on Patentability dated Aug. 29, 2023 with a Translation of the Written Opinion of the International Searching Authority in Application No. PCT/JP2022/003660.
International Preliminary Report on Patentability dated Aug. 29, 2023 with a Translation of the Written Opinion of the International Searching Authority in Application No. PCT/JP2022/003661.
International Preliminary Report on Patentability dated Aug. 29, 2023 with a Translation of the Written Opinion of the International Searching Authority in Application No. PCT/JP2022/003664.
International Preliminary Report on Patentability dated Aug. 29, 2023 with a Translation of the Written Opinion of the International Searching Authority in Application No. PCT/JP2022/003665.
International Preliminary Report on Patentability dated Aug. 29, 2023 with a Translation of the Written Opinion of the International Searching Authority in Application No. PCT/JP2022/007735.
International Preliminary Report on Patentability dated Aug. 29, 2023 with a Translation of the Written Opinion of the International Searching Authority in Application No. PCT/JP2022/007737.
International Preliminary Report on Patentability dated Aug. 29, 2023 with a Translation of the Written Opinion of the International Searching Authority in Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
European Search Report issued Dec. 4, 2024 for European Patent Application No. 22759287.0.

European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.

(56)        References Cited

OTHER PUBLICATIONS

International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
European Search Report issued Feb. 10, 2025 for European Patent Application No. 22759283.9.
European Search Report issued Feb. 20, 2025 for European Patent Application No. 22759263.1.
Extended European Search Report dated Mar. 11, 2026 in application No. 23 780 928.0.
Extended European Search Report dated Mar. 11, 2026 in application No. 23 780 929.8.
Extended European Search Report dated Mar. 11, 2026 in application No. 23 780 936.3.
Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

* cited by examiner

POWER STORAGE ASSEMBLY AND GASKET

CROSS-REFERENCE TO RELATED APPLICATIONS

This application is a Rule 53(b) Continuation of International Application No. PCT/JP2020/032239 filed Aug. 26, 2020, which claims priority based on Japanese Patent Application No. 2019-153773 filed Aug. 26, 2019, Japanese Patent Application No. 2020-038592 filed Mar. 6, 2020, Japanese Patent Application No. 2020-038598 filed Mar. 6, 2020 and Japanese Patent Application No. 2020-038601 filed Mar. 6, 2020, the respective disclosures of which are incorporated herein by reference in their entireties.

TECHNICAL FIELD

The present disclosure relates to a power storage assembly and a gasket.

BACKGROUND ART

Tetrafluoroethylene/fluoroalkyl vinyl ether copolymers, which have good insulating properties, are used for insulating members of batteries and the like.

For example, in Patent Literature 1, a sealing material is described which is composed of a fluorine-containing polymer having a polymerization unit based on tetrafluoroethylene and a polymerization unit based on one or more perfluoro(alkyl vinyl ether)s, wherein the fluorine-containing polymer has a content of the polymerization unit based on perfluoro(alkyl vinyl ether)s of 4.0% by mass or lower with respect to the whole of the polymerization units, and has a melt flow rate of 0.1 to 100 g/10 min.

CITATION LIST

Patent Literature

Patent Literature 1: Japanese Patent Laid-Open No. 2013-177574

SUMMARY

According to the present disclosure, there is provided a power storage assembly comprising a gasket containing a copolymer containing a tetrafluoroethylene unit and a fluoro (alkyl vinyl ether) unit, wherein the copolymer has a content of the fluoro(alkyl vinyl ether) unit of 2.0 to 6.0% by mass with respect to the whole of the monomer units, a melt flow rate of 0.5 to 55 g/10 min, and the number of functional groups of 50 or less per $10^6$ main-chain carbon atoms.
Effects The present disclosure enables to provide a power storage assembly which is high in sealing property which does not deteriorate even in the case where the temperature becomes abnormally high.

The present disclosure further enables to provide a gasket which can remarkably enhance the sealing property of a power storage assembly, which does not deteriorate even in the case where the temperature becomes abnormally high.

DESCRIPTION OF EMBODIMENTS

Figure 1:
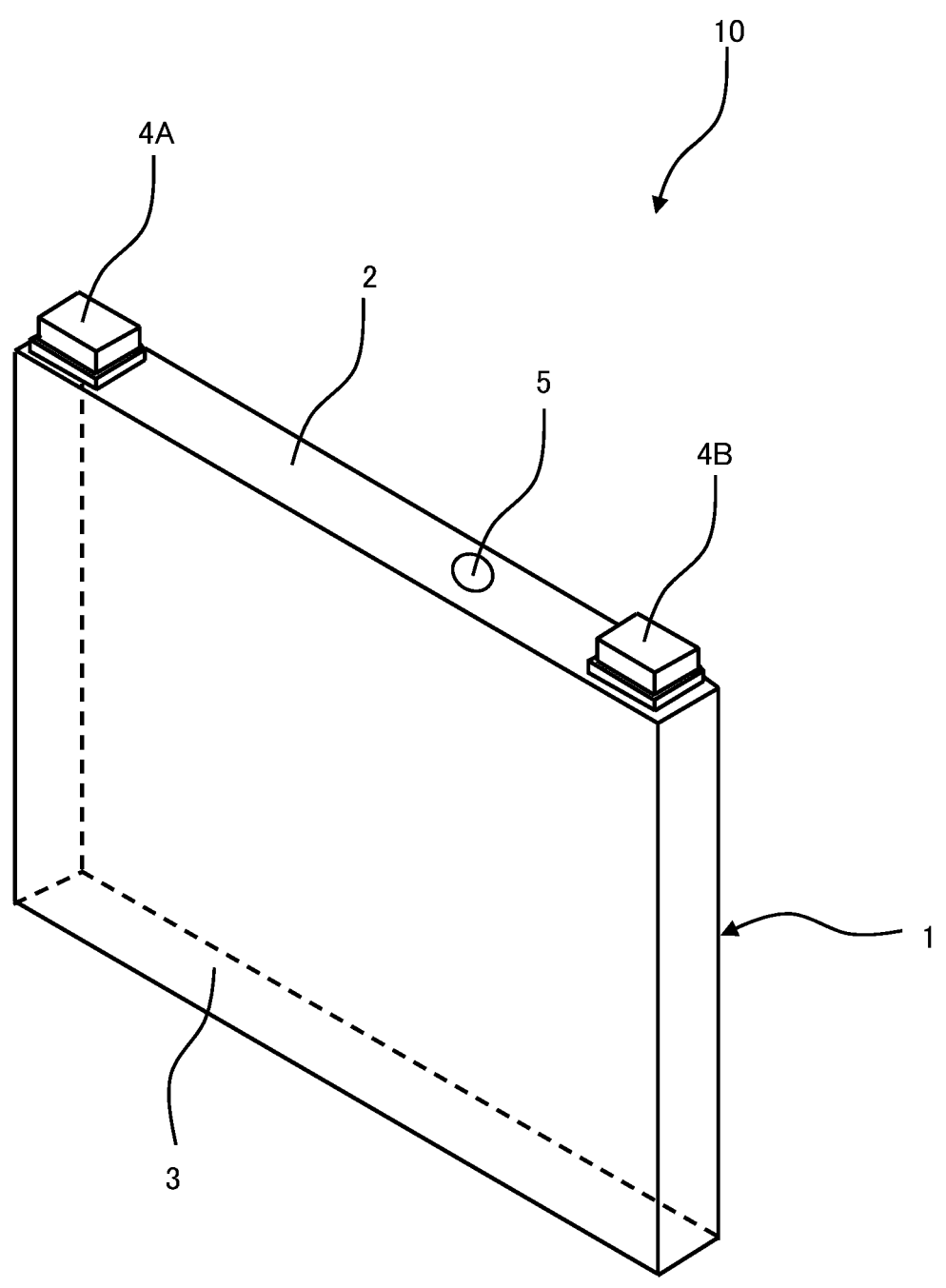
FIG. 1 is an external perspective view of a power storage assembly.

Hereinafter, specific embodiments of the present disclosure will be described in detail, but the present disclosure is not limited to the following embodiments.

A power storage assembly of the present disclosure has a gasket containing a copolymer containing a tetrafluoroethylene (TFE) unit and a fluoro(alkyl vinyl ether) (FAVE) unit.

Patent Document 1 describes that a vehicular secondary battery is sometimes exposed to a high temperature of 85° C. or higher in the use environment, and in order to keep the airtightness and the liquid tightness of the battery interior, it is important that a sealing material exhibits a sufficient compression recovering property even under such a severe use condition, and can maintain high adhesion between an exterior can and a sealing body.

However, it might be insufficient only to prevent an electrolytic solution injected in a power storage assembly from leaking outside. There is a known technology of preventing liquid leakage of an electrolytic solution from a power storage assembly by installing a gasket to the power storage assembly. Conventional power storage assemblies are capable of preventing a liquid leakage, however, may cannot sufficiently prevent the electrolytic solution to permeate through a gasket and being diffused outside the power storage assemblies. In particular, in recent years, since the use of power storage assemblies has been frequently used under an environment where the temperature becomes high, and the amount of an electrolytic solution permeating through a gasket is liable to become large, the importance of further suppressing the permeation of the electrolytic solution is increasing. Further, since the life of power storage assembly is lengthened recently, in the case where the electrolytic solution is diffused outside the power storage assembly, the amount of the electrolytic solution in the power storage assembly may gradually decrease and this may adversely affect also the power storage performance, by using the power storage assembly for a long period.

It has been found that sealing a power storage assembly by using a gasket containing a copolymer in which the content of the FAVE unit, the melt flow rate (MFR) and the number of functional groups are suitably controlled, can prevent not only the leakage of an electrolytic solution from the power storage assembly, but also the permeation through the gasket of the electrolytic solution and the diffusion thereof to the outside. Additionally, it has also been found that the gasket containing such a copolymer exhibits excellent sealability even at high temperatures, and therefore, even in the case where the power storage assembly abnormally generates heat and the temperature becomes high, the leakage and the diffusion of the electrolytic solution to the outside can be also prevented. These excellent effects are sufficiently exhibited even in the case where the maximum temperature of the power storage assembly rises to 150° C. or higher. Further, such a gasket does not corrode a metal mold used for injection molding, and can be produced in a high productivity by injection molding, and even when being contacted with an electrolytic solution, hardly makes fluorine ions to dissolve out. Therefore, the power storage assembly having such a gasket can be produced in a high productivity and at a low cost, and is excellent in the power storage performance and highly suppresses the deterioration of the power storage performance and the shortening of the service life.

The power storage assembly of the present disclosure has been completed based on these findings, and exhibits high sealing property which does not deteriorate even in the case where the temperature becomes abnormally high.

The copolymer contained in the gasket equipped in the power storage assembly of the present disclosure is a melt-fabricable fluororesin. The melt-fabricability means that a polymer can be melted and processed by using conventional processing devices such as an extruder or an injection molding machine.

The copolymer contained in the gasket equipped in the power storage assembly of the present disclosure contains the TFE unit and the FAVE unit. The FAVE constituting the FAVE unit includes at least one selected from the group consisting of monomers represented by the general formula (1):

$$CF_2=CFO(CF_2CFY^1O)_p-(CF_2CF_2CF_2O)_q-Rf \qquad (1)$$

wherein $Y^1$ represents F or $CF_3$; Rf represents a perfluoro-alkyl group having 1 to 5 carbon atoms; p represents an integer of 0 to 5; and q represents an integer of 0 to 5, and monomers represented by the general formula (2):

$$CFX=CXOCF_2OR^1 \qquad (2)$$

wherein X are identical or different, and represent H, F or $CF_3$; and $R^1$ represents a linear or branched fluoroalkyl group having 1 to 6 carbon atoms and optionally having one or two atoms of at least one kind of atoms selected from the group consisting of H, Cl, Br and I, or a cyclic fluoroalkyl group having 5 or 6 carbon atoms and optionally having one or two atoms of at least one kind of atoms selected from the group consisting of H, Cl, Br and I.

Among these, the FAVE is preferably a monomer represented by the general formula (1), more preferably at least one selected from the group consisting of perfluoro(methyl vinyl ether), perfluoro(ethyl vinyl ether) (PEVE), and perfluoro(propyl vinyl ether) (PPVE), still more preferably at least one selected from the group consisting of PEVE and PPVE, and especially preferably PPVE.

The content of the fluoroalkyl vinyl ether (FAVE) unit of the copolymer is 2.0 to 6.0% by mass with respect to the whole of the monomer units.

The content of the FAVE unit of the copolymer is preferably 5.5% by mass or lower, more preferably 5.0% by mass or lower and still more preferably 4.7% by mass or lower. The copolymer satisfying the above range regarding the FAVE unit content provides a gasket which enables to suppress further more permeation of the electrolytic solution and has further improved sealability at high temperatures; therefore, the power storage assembly having further high sealing property which can be much less deteriorated even in the case where the temperature becomes abnormally high, can be provided.

The content of the FAVE unit of the copolymer is, from the viewpoint of suppressing the permeation of the electrolytic solution in a very high level, and improving the sealability at high temperatures to a very high level, preferably 2.2% by mass or higher, more preferably 2.4% by mass or higher and still more preferably 2.6% by mass or higher, and preferably 4.4% by mass or lower.

The content of the FAVE unit of the copolymer is, from the viewpoint of suppressing the permeation of the electrolytic solution in a much higher level, and improving the sealability at high temperatures to a much higher level, preferably 4.2% by mass or lower, more preferably 3.8% by mass or lower, still more preferably 3.5% by mass or lower and especially preferably 3.2% by mass or lower.

The content of the tetrafluoroethylene (TFE) unit of the copolymer is 98.0 to 94.0% by mass with respect to the whole of the monomer units.

The content of the TFE unit of the copolymer is preferably 94.5% by mass or higher, more preferably 95.0% by mass or higher and still more preferably 95.3% by mass or higher. The copolymer satisfying the above range regarding the TFE unit content provides a gasket which enables to suppress further more permeation of the electrolytic solution and has further improved sealability at high temperatures; therefore, the power storage assembly having further high sealing property which can be much less deteriorated even in the case where the temperature becomes abnormally high, can be provided.

The content of the TFE unit of the copolymer is, from the viewpoint of suppressing the permeation of the electrolytic solution in a very high level, and improving the sealability at high temperatures to a very high level, preferably 97.8% by mass or lower, more preferably 97.6% by mass or lower and still more preferably 97.4% by mass or lower, and preferably 95.6% by mass or higher.

The content of the TFE unit of the copolymer is, from the viewpoint of suppressing the permeation of the electrolytic solution in a much higher level, and improving the sealability at high temperatures to a much higher level, preferably 95.8% by mass or higher, more preferably 96.2% by mass or higher, still more preferably 96.5% by mass or higher and especially preferably 96.8% by mass or higher.

In the present disclosure, the content of each monomer unit in the copolymer can be measured by a 19F-NMR method.

The copolymer may also contain monomer units derived from monomers copolymerizable with TFE and FAVE. In this case, the content of the monomer units copolymerizable with TFE and FAVE is, with respect to the whole of the monomer units of the copolymer, preferably 0 to 4.00% by mol, more preferably 0.05 to 1.40% by mol and still more preferably 0.10 to 0.50% by mol.

The monomers copolymerizable with TFE and FAVE may include hexafluoropropylene (HFP), vinyl monomers represented by $CZ^1Z^2=CZ^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2=CF-OCH_2-Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the FAVE unit, and TFE/HFP/FAVE copolymer, and is more preferably a copolymer consisting only of the TFE unit and the FAVE unit.

The melt flow rate (MFR) of the copolymer is 0.5 to 55 g/10 min.

The MFR of the copolymer is preferably 1.0 g/10 min or higher and more preferably 5.0 g/10 min or higher. The copolymer satisfying the above MFR range provides a gasket which enables to suppress further more permeation of the electrolytic solution and has further improved sealability at high temperatures; therefore, the power storage assembly having further high sealing property which can be much less deteriorated even in the case where the temperature becomes abnormally high, can be provided.

The MFR of the copolymer is, from the viewpoint of suppressing the permeation of the electrolytic solution in a very high level, and improving the sealability at high temperatures to a very high level, preferably 50 g/10 min or lower.

The MFR of the copolymer is, from the viewpoint of suppressing the permeation of the electrolytic solution in a much higher level, and improving the sealability at high temperatures to a much higher level, preferably 45 g/10 min or lower, more preferably 40 g/10 min or lower, still more preferably 35 g/10 min or lower and especially preferably 30 g/10 min or lower.

The MFR of the copolymer is, in the case where the sealability at a very high temperature (for example, 150° C.) is especially required, preferably 20 g/10 min or lower, more preferably 15 g/10 min or lower, still more preferably 10 g/10 min or lower and especially preferably 5.0 g/10 min or lower.

Alternatively, the MFR of the copolymer is, in the case where there is attached much importance to the balance between the low permeation and the sealability of the electrolytic solution and the easiness of production of the gasket, may be 10 g/10 min or higher, or may be 20 g/10 min or higher.

In the present disclosure, the melt flow rate of the copolymer is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The number of functional groups per $10^6$ main-chain carbon atoms of the copolymer is 50 or less. The number of functional groups is preferably 40 or less, more preferably 30 or less, still more preferably 20 or less and especially preferably 15 or less. The copolymer satisfying the above range regarding the number of functional groups provides a gasket which enables to suppress further more permeation of the electrolytic solution and has further improved sealability at high temperatures; therefore, the power storage assembly having further high sealing property which can be much less deteriorated even in the case where the temperature becomes abnormally high, can be provided. Further, corrosion of a metal mold used for injection molding can more be suppressed and dissolving out of fluorine ions into the electrolytic solution can more be suppressed.

For identification of the kind of the functional groups and measurement of the number of the functional groups, infrared spectroscopy can be used.

The number of the functional groups is measured, specifically, by the following method. First, the copolymer is molded by cold press to prepare a film of 0.25 to 0.3 mm in thickness. The film is analyzed by Fourier transform infrared spectroscopy to obtain an infrared absorption spectrum, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the copolymer is calculated according to the following formula (A).

$$N = I \times K / t \qquad (A)$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

[Table 1]

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH₃ | 1795 | 680 | 342 | $C_7F_{15}COOCH_3$ |
| —CONH₂ | 3436 | 506 | 460 | $C_7H_{15}CONH_2$ |
| —CH₂OH₂, —OH | 3648 | 104 | 2236 | $C_7H_{15}CH_2OH$ |
| —CF₂H | 3020 | 8.8 | 26485 | $H(CF_2CF_2)_3CH_2OH$ |
| —CF=CF₂ | 1795 | 635 | 366 | $CF_2=CF_2$ |

Absorption frequencies of —CH₂CF₂H, —CH₂COF, —CH₂COOH, —CH₂COOCH₃ and —CH₂CONH₂ are lower by a few tens of kaysers ($cm^{-1}$) than those of —CF₂H, —COF, —COOH free and —COOH bonded, —COOCH₃ and —CONH₂ shown in the Table, respectively.

For example, the number of the functional group —COF is the total of the number of a functional group determined from an absorption peak having an absorption frequency of 1,883 $cm^{-1}$ derived from —CF₂COF and the number of a functional group determined from an absorption peak having an absorption frequency of 1, 840 $cm^{-1}$ derived from —CH₂COF.

The functional groups are ones present on main chain terminals or side chain terminals of the copolymer, and ones present in the main chain or the side chains. The number of the functional groups may be the total of numbers of —CF=CF₂, —CF₂H, —COF, —COOH, —COOCH₃, —CONH₂ and —CH₂OH.

The functional groups are introduced to the copolymer by, for example, a chain transfer agent or a polymerization initiator used for production of the copolymer. For example, in the case of using an alcohol as the chain transfer agent, or a peroxide having a structure of —CH₂OH as the polymerization initiator, —CH₂OH is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer is preferably one which is subjected to the fluorination treatment. Further, the copolymer preferably has —CF₃ terminal groups.

In one embodiment of a gasket, the gasket can contain a copolymer containing the TFE unit and the FAVE unit wherein the copolymer has a content of the FAVE unit of 2.0 to 4.4% by mass with respect to the whole of the monomer units, a melt flow rate of 0.5 to 50 g/10 min, and the number of functional groups of 50 or less per $10^6$ main-chain carbon atoms. In accordance with this embodiment, the gasket enables to suppress the permeation of an electrolytic solution in a very high level, and a power storage assembly can be sealed in a very high level even in a high-temperature environment. Therefore, the power storage assembly having very high sealing property which can be much less deteriorated even in the case where the temperature becomes abnormally high, can be provided.

In one embodiment of a gasket, the gasket can contain a copolymer having a content of the FAVE unit of 2.0 to 4.2% by mass with respect to the whole of the monomer units, a melt flow rate of 0.5 to 45 g/10 min, and the number of functional groups of 50 or less per $10^6$ main-chain carbon atoms. In accordance with this embodiment, the gasket enables to suppress permeation of the electrolytic solution at a further high level and to seal a power storage assembly in a further high level even under high temperatures. Therefore, a power storage assembly having further high sealing property which can be hardly deteriorated even in the case where the temperature becomes abnormally high, can be provided.

The low permeation of the electrolytic solution through the gasket can be evaluated, for example, based on the amount of fluorine ions dissolving out in an electrolytic solution permeation test described later. The sealability at high temperatures of the gasket can be evaluated, for example, based on the surface pressure at 150° C. of the gasket.

It has been found that by further controlling the content of the FAVE unit of the copolymer which the gasket contains, the permeation of the electrolytic solution can be suppressed in a much higher level, and the sealability at high temperatures can be improved to a much higher level. The content of the FAVE unit of the copolymer which the gasket contains is, from the viewpoint of suppressing the permeation of the electrolytic solution in a much higher level, and improving the sealability at high temperatures to a much higher level, preferably 4.2% by mass or lower, more preferably 3.8% by mass or lower, still more preferably 3.5% by mass or lower and especially preferably 3.2% by mass or lower.

The content of the TFE unit of the copolymer which the gasket contains is, from the viewpoint of suppressing the permeation of the electrolytic solution in a much higher level, and improving the sealability at high temperatures to a much higher level, preferably 95.8% by mass or higher, more preferably 96.2% by mass or higher, still more preferably 96.5% by mass or higher and especially preferably 96.8% by mass or higher.

It has been found that by further controlling the MFR of the copolymer which the gasket contains, the permeation of the electrolytic solution can be suppressed in a much higher level, and the sealability at high temperatures can be improved to a much higher level. The MFR of the copolymer which the gasket contains is, from the viewpoint of suppressing the permeation of the electrolytic solution in a much higher level, and improving the sealability at high temperatures to a much higher level, preferably 45 g/10 min or lower, more preferably 40 g/10 min or lower, still more preferably 35 g/10 min and especially preferably 30 g/10 min or lower.

The MFR of the copolymer which the gasket contains is, in the case where the sealability at a very high temperature (for example, 150° C.) is especially required, preferably 20 g/10 min or lower, more preferably 15 g/10 min or lower, still more preferably 10 g/10 min or lower and especially preferably 5.0 g/10 min or lower.

The melting point of the copolymer is preferably 298 to 315° C. and more preferably 302 to 310° C. The copolymer satisfying the above range regarding the melting point provides a gasket which enables to suppress further more permeation of the electrolytic solution and has further improved sealability at high temperatures; therefore, the power storage assembly having further high sealing property which can be much less deteriorated even in the case where the temperature becomes abnormally high, can be provided.

In the present disclosure, the melting point can be measured by using a differential scanning calorimeter [DSC].

In the copolymer, the amount of fluorine ions dissolving out therefrom and detected in an electrolytic solution immersion test is, in terms of mass, preferably 1.0 ppm or less, more preferably 0.9 ppm or less and still more preferably 0.8 ppm or less. The copolymer satisfying the above range regarding the amount of fluorine ions dissolving out enables to further suppress generation of gasses such as HF in the electrolytic solution, the deterioration of the performance, and the shortening of the service life of the power storage assembly.

In the present disclosure, the electrolytic solution immersion test can be carried out by preparing a molded test piece of the copolymer having a weight corresponding to that of 10 sheets of molded articles (15 mm×15 mm×0.2 mm) of the copolymer, and putting, in a thermostatic chamber of 80° C., a glass-made sample bottle in which the test piece and 2 g of dimethyl carbonate (DMC) and allowing the resultant to stand for 144 hours.

The amount of the electrolytic solution permeation of the copolymer may be 0.0055 g/1,000 h or smaller, and is preferably 0.0050 g/1,000 h or smaller, more preferably 0.0047 g/1,000 h or smaller, still more preferably 0.0045 g/1,000 h or smaller and especially preferably 0.0042 g/1,000 h or smaller; and the lower limit is not limited, but may be 0.0020 g/1,000 h or larger. The copolymer satisfying the above range regarding the amount of the electrolytic solution permeation of the copolymer enables to provide the power storage assembly having much higher sealing property which can be much less deteriorated even in the case where the temperature becomes abnormally high. The amount of the electrolytic solution permeating the copolymer can be reduced by controlling the content of the FAVE unit, the melt flow rate (MFR) and the number of functional groups of the copolymer.

The amount of an electrolytic solution permeation of the copolymer can be identified by measuring the mass of an electrolytic solution (EC/DEC (30/70% by volume) permeating the gasket (outer diameter: φ17.7 mm, inner diameter: φ14.3 mm, thickness: 1.6 mmt) under the condition of 60° C. and 1,000 hours, where the gasket used is obtained by injection molding the copolymer.

The storage elastic modulus (E') at 150° C. of the copolymer is preferably 10 MPa or higher and more preferably 50 MPa or higher, and preferably 1,000 MPa or lower, more preferably 500 MPa or lower and still more preferably 200 MPa or lower. The copolymer satisfying the above range regarding the storage elastic modulus (E') at 150° C. enables to provide the power storage assembly having a sealing property which can be much less deteriorated even in the case where the temperature becomes abnormally high.

The storage elastic modulus (E') can be measured by carrying out a dynamic viscoelasticity measurement under the condition of a temperature-increasing rate of 2° C./min and a frequency of 10 Hz and in the range of 30 to 250° C.

The surface pressure at 150° C. of the copolymer is preferably 0.3 MPa or higher, more preferably 0.5 MPa or higher and still more preferably 0.8 MPa or higher; the upper limit is not limited, but may be 2.0 MPa or lower. The gasket containing the copolymer having high surface pressure at 150° C. can exhibit excellent sealability at high temperatures. Therefore, use of a gasket containing such a copolymer enables to provide the power storage assembly having a sealing property which can be much less deteriorated even in the case where the temperature becomes abnormally high. The surface pressure at 150° C. of the copolymer can be raised by controlling the content of the FAVE unit, the melt flow rate (MFR) and the number of functional groups of the copolymer.

The surface pressure can be determined as follows. A test piece is deformed at a compression deformation rate of 50%, allowed to stand as is at 150° C. for 18 hours, released from the compressive state and allowed to stand at room temperature for 30 min, and thereafter, the height of the test piece (height of the test piece after being compressively deformed) is measured; and the surface pressure can be calculated by the following formula using the height of the test piece after being compressively deformed, and the storage elastic modulus (MPa) at 150° C.

$$\text{surface pressure at } 150° \text{ C. (MPa)} = (t_2 - t_1)/t_1 \times E'$$

$t_1$: an original height (mm) of a test piece before being compressively deformed×50%

$t_2$: a height (mm) of the test piece after being compressively deformed $E'$: a storage elastic modulus (MPa) at 150° C.

The copolymer for forming the gasket equipped in the power storage assembly of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

dialkyl peroxycarbonates such as di-n-propyl peroxydicarbonate, diisopropyl peroxydicarbonate, di-sec-butyl peroxydicarbonate and di-2-ethoxyethyl peroxydicarbonate;

peroxyesters such as t-butyl peroxyisobutyrate and t-butyl peroxypivalate;

dialkyl peroxides such as di-t-butyl peroxide; and di[fluoro(or fluorochloro)acyl] peroxides.

The di[fluoro(or fluorochloro)acyl] peroxides include diacyl peroxides represented by $[(RfCOO)—]_2$ wherein Rf is a perfluoroalkyl group, an ω-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydrohexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite or a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2H$ and $CF_3CF_2CF_2CF_2CF_2CF_2H$; hydrofluoroethers such as $CH_3OC_2F_5$, $CH_3OC_3F_5CF_2CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be molded into pellets. A method of molding into pellets is not limited, and a conventionally known method can be used. Examples thereof include methods of melt extruding the copolymer by using a single-screw extruder, a twin-screw extruder or a tandem extruder and cutting the resultant into a predetermined length to mold the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —COOCH$_3$, —CH$_2$OH, —COF, —CF=CF$_2$ and —CONH$_2$, and thermally relatively stable functional groups thereof, such as —CF$_2$H, can be converted to thermally very stable —CF$_3$. Consequently, the total number (number of functional groups) of COOH, —COOCH$_3$, —CH$_2$OH, —COF, —CF=CF$_2$, —CONH$_2$ and —CF$_2$H of the copolymer can easily be controlled in the above-mentioned range.

The fluorine-containing compound is not limited, but includes fluorine radical sources generating fluorine radicals under the fluorination treatment condition. The fluorine radical sources include F$_2$ gas, CoF$_3$, AgF$_2$, UF$_6$, OF$_2$, N$_2$F$_2$, CF$_3$OF, halogen fluorides (for example, IF$_5$ and ClF3).

The fluorine radical source such as F$_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas (F$_2$ gas).

The gasket, as required, may contain other components. The other components may include fillers, plasticizers, pigments, colorants, antioxidants, ultraviolet absorbents, flame retarders, antiaging agents, antistatic agents and antibacterial agents.

As the other components, above all, fillers are preferred. Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber.

As described above, the gasket can contain other components other than the copolymer. However, from the viewpoint of making the gasket to sufficiently exhibit excellent properties of the copolymer, the gasket preferably contains less amounts of the other components, and most preferably contains no other components. Specifically, the amount of the other components is, with respect to the mass of the gasket, preferably 30% by mass or lower, more preferably 10% by mass or lower and most preferably 0% by mass, that is, it is most preferable that the gasket contains no other components. The gasket may be one consisting only of the copolymer.

The gasket can be produced by molding the copolymer or a composition containing the copolymer and the other components into a desired shape and size. A method of producing the composition includes a method of dry mixing the copolymer and the other components, and a method of previously mixing the copolymer and the other components by a mixer and then melt kneading the mixture by a kneader, melt extruder or the like.

A method of molding the copolymer or the composition is not limited, and includes injection molding, extrusion, compression molding, blow molding and transfer molding. Among these, preferred are compression molding, injection molding or transfer molding; and injection molding or transfer molding are more preferred because the gasket can be produced in a high productivity. That is, the gasket is preferably an injection molded article or a transfer molded article, because the gasket can be produced in a high productivity.

Then, a power storage assembly according to one embodiment of the present disclosure will be described by reference to the drawings.

A power storage assembly illustrated in FIG. 1 is a closed rectangular secondary battery. The power storage assembly 10 has an exterior can 1 and a lid 2. The exterior can 1 has an opening (not shown in figure) formed on the upper part facing the bottom face 3.

In the exterior can 1, an electric element (not shown in figure) such as a power generator is housed, and the opening of the exterior can is hermetically sealed with the lid 2. The peripheral portion of the lid 2 is joined to the edge portion of the opening of the exterior can 1.

The lid 2 is provided with a liquid injection hole for injecting an electrolytic solution in the exterior can 1. The electrolytic solution may be one or two or more known solvents such as propylene carbonate, ethylene carbonate, butylene carbonate, γ-butyrolactone, 1,2-dimethoxyethane, 1,2-diethoxyethane, dimethyl carbonate, diethyl carbonate and ethyl methyl carbonate. Solutions can also be used in which an electrolyte is dissolved in an electrolytic solution. The electrolyte is not limited, but may be LiClO$_4$, LiAsF$_6$, LiPF$_6$, LiBF$_4$, LiCl, LiBr, CH$_3$SO$_3$Li, CF$_3$SO$_3$Li, cesium carbonate and the like.

After the electrolytic solution is injected through the liquid injection hole into the exterior can 1, the liquid injection hole is installed with a plug 5, and the plug 5 is jointed to the edge portion of the liquid injection hole of the lid 2. The joining can be carried out by welding using laser.

The lid 2 is installed with a first external terminal 4A and a second external terminal 4B; and an externally generated electric power is supplied through the first external terminal 4A and the second external terminal 4B to the electric element, and is stored in the power storage assembly; and then, the power is supplied to an external load. For example, the first external terminal 4A is a positive electrode terminal; and the second external terminal 4B is a negative electrode terminal. The first external terminal 4A is constituted, for example, of aluminum or an aluminum alloy. The second external terminal 4B is constituted, for example, of copper or a copper alloy.

Figure 2:
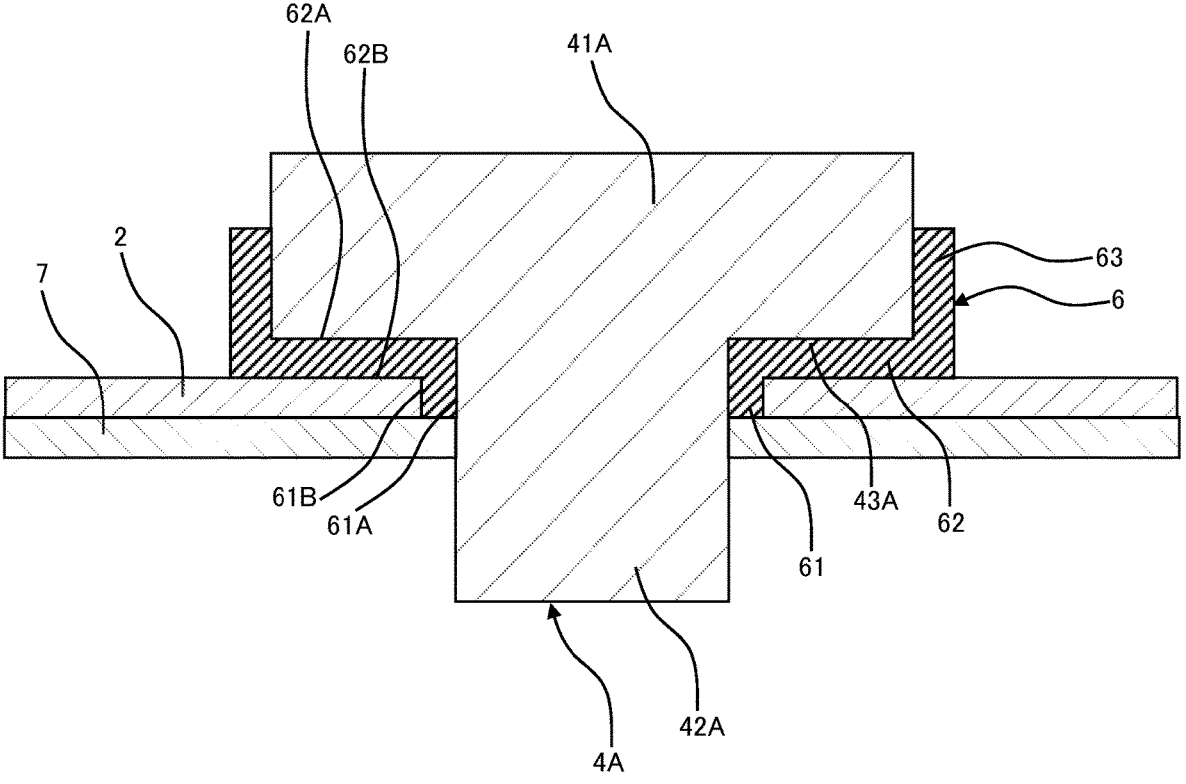
FIG. 2 is a schematic cross-sectional view illustrating a constitution of a terminal part of a power storage assembly.

In order to electrically insulate the first external terminal 4A and the second external terminal 4B from the lid 2, gaskets 6 and insulating members 7 are installed on the lid 2. FIG. 2 is a schematic cross-sectional view illustrating a constitution of a terminal part of a power storage assembly. Places are usually different where the first external terminal and the second external terminal are arranged on a constituting material or the lid 2, but since the other constitutions can be made identical, the following description will be made by way of an example of the first external terminal 4A.

As illustrated in FIG. 2, the first external terminal 4A has a terminal head part 41A having a rectangular parallelepiped block shape and a cylindrical shaft part 42A. The terminal head part 41A has an external profile of a rectangular lower face 43A; and the shaft part 42A protrudes from the lower face 43A of the terminal head part 41A.

As illustrated in FIG. 2, the gasket 6 has a cylindrical part 61, a flange part 62 extending from one opening of the cylindrical part 61 in the radial direction, and a side wall part 63 rising from the periphery of the flange part 62.

The cylindrical part 61 is externally fitted on the shaft part 42A of the first external terminal 4A, and the contacting face 61A of the inner peripheral portion of the cylindrical part 61 makes contact with an outer peripheral face of the shaft part 42A. Then, the cylindrical part 61 is inserted in a through-hole of the lid 2, and the contacting face 61B of the outer peripheral portion of the cylindrical part 61 makes contact with the inner peripheral face of the through-hole of the lid 2.

The flange part 62 is held between the lid 2 and the first external terminal 4A, and the contacting face 62A of the flange part 62 makes contact with the lower face 43A of the first external terminal 4A. Further, the contacting face 62B of the flange part 62 makes contact with a front side of the lid 2.

The gasket 6 makes contact with the first external terminal 4A and the lid 2 in the state that the cylindrical part 61 and the flange part 62 of the gasket 6 are compressed, and the sealing property of the power storage assembly can thereby be secured.

By suitably controlling the content of the FAVE unit, the melt flow rate (MFR) and the number of functional groups of the copolymer to form the gasket 6, as well as suitably controlling the thickness of the gasket 6, the sealing property of the power storage assembly can be further enhanced. The thickness of the gasket is preferably 0.5 to 2.5 mm, more preferably 2.0 mm or smaller, still more preferably 1.5 mm or smaller and especially preferably 1.0 mm or smaller. A gasket having a smaller thickness can suppress further more permeation of the electrolytic solution, however, in the case where the thickness of the gasket is too small, sufficient rebound resilience and sufficient sealing property (for example, liquid leakage resistance) cannot be provided. By suitably controlling the content of the FAVE unit, the melt flow rate (MFR) and the number of functional groups of the copolymer, and by suitably controlling the thickness of the gasket, the permeation of the electrolytic solution can be further more suppressed while further enhancing the sealing property of the power storage assembly.

Figure 3:
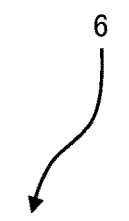
FIG. 3 is a front view of a gasket.
Figure 3:
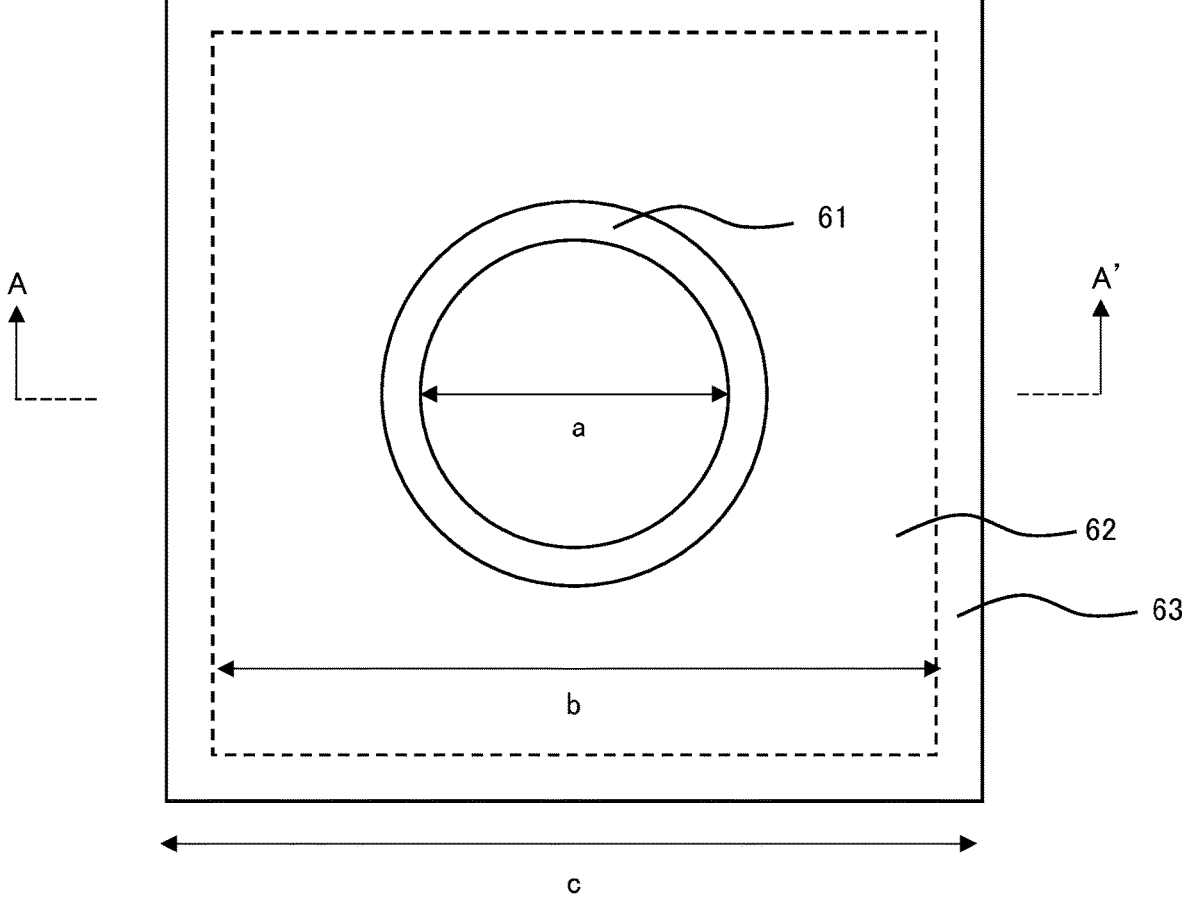
Figure 4:
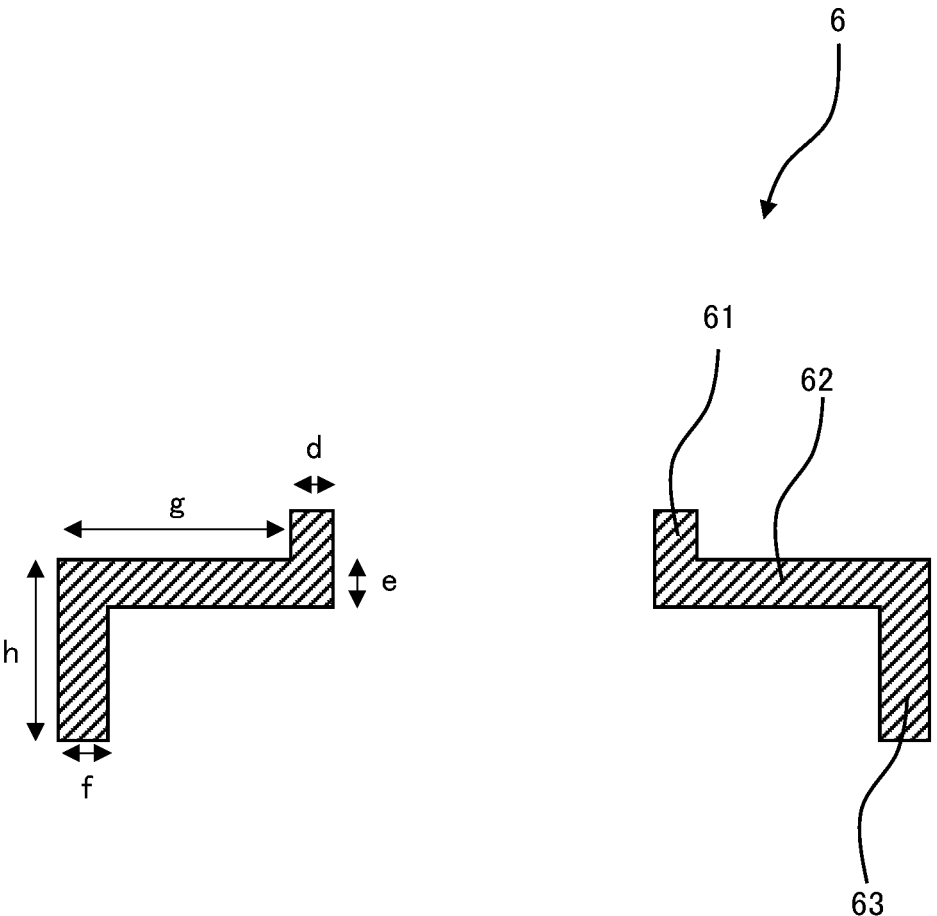
FIG. 4 is a cross-sectional view taken on line A-A' of FIG. 3.

FIG. 3 is a front view of the gasket 6; and FIG. 4 is a cross-sectional view taken on line A-A' of the gasket 6. In the present disclosure, the thickness of the gasket refers to the thickness of parts contributing to the sealing property of the power storage assembly, and is, in the gasket 6 illustrated in FIG. 4, thickness d and thickness e. The thickness d and the thickness e may be different from each other as in the gasket illustrated in FIG. 4, or may be identical. In either the case of the thickness d and the thickness e being identical or the case of being different, it is preferable that the thicknesses of the both are suitably controlled. Then, in consideration of the productivity of the gasket, since that variation in the thicknesses is preferably not large, the thicknesses of parts of the whole gasket may be controlled in the above range. In the gasket illustrated in FIG. 4, not only the thickness d and the thickness e, but also the thickness f is suitably controlled to fall in the above range.

By suitably controlling the content of the FAVE unit, the melt flow rate (MFR) and the number of functional groups of the copolymer to form the gasket 6, as well as suitably controlling the sealing area of the gasket 6, the sealing property of the power storage assembly can further be enhanced. The sealing area of the gasket is preferably 0.5 to 50 $cm^2$, and the upper limit thereof is more preferably 35 $cm^2$, the upper limit thereof is still more preferably 20 $cm^2$ and the upper limit thereof is especially preferably 10 $cm^2$; and the lower limit thereof is more preferably 1 $cm^2$ and the lower limit thereof is still more preferably 2 $cm^2$. A smaller sealing area of the gasket gives a larger distance between the inside and the outside of the power storage assembly, and the permeation of the electrolytic solution can much more be suppressed, but since downsizing of the power storage assembly is demanded, the sealing area needs to be made small; however, it is difficult for conventional gaskets to reduce the sealing area and simultaneously sufficiently suppress the permeation of the electrolytic solution. The gasket of the present disclosure enables to suppress the permeation of the electrolytic solution further more while achieving the downsizing of the power storage assembly by reducing the sealing area of the gasket as mentioned above, since the copolymer is suitably controlled in terms of the content of the FAVE unit, the melt flow rate (MFR) and the number of functional groups.

In the present disclosure, the sealing area of the gasket is an area of portions contributing to the sealing property of the power storage assembly, and is, in the gasket 6 illustrated in FIG. 2, a total area of the contacting faces 61A, 61B, 62A and 62B.

By suitably controlling the content of the FAVE unit, the melt flow rate (MFR) and the number of functional groups of the copolymer forming the gasket 6, as well as suitably controlling the compression deformation rate of the gasket, the sealing property of the power storage assembly can be further enhanced. The compression deformation rate of the gasket is preferably 20 to 60%. The compression deformation rate of the gasket can be calculated by the following formula.

Compression deformation rate (%)=[(a thickness of the gasket before being compressed)−(a thickness of the gasket in the compressed state)]/(the thickness of the gasket before being compressed)×100

In one embodiment, a gasket illustrated in FIG. 3 and FIG. 4 has the following size.

a: 4.0 mm
b: 9.4 mm
c: 10.6 mm
d: 0.5 mm
e: 0.6 mm
f: 0.6 mm
g: 2.8 mm
h: 2.2 mm

In FIG. 1 and FIG. 2, a closed rectangular secondary battery has been described as the power storage assembly, but the power storage assembly of the present disclosure may be other types of power storage assembly. The power storage assembly may be, for example, a primary battery or may be, for example, a power storage battery (secondary battery) or a power storage element. The power storage assembly may also be a nonaqueous electrolyte battery. The nonaqueous electrolyte battery includes every battery having an electrolytic solution and an electric power generating element. Examples of the nonaqueous electrolyte battery include lithium ion primary batteries, lithium ion secondary batteries, nickel hydrogen batteries, lithium ion capacitors and electric double layer capacitors.

So far, embodiments have been described, but it is to be understood that various changes and modifications of patterns and details may be made without departing from the subject matter and the scope of the claims.

According to the present disclosure, there is provided a power storage assembly comprising a gasket containing a copolymer containing a tetrafluoroethylene unit and a fluoro(alkyl vinyl ether) unit, wherein the copolymer has a content of the fluoro(alkyl vinyl ether) unit of 2.0 to 6.0% by mass with respect to the whole of the monomer units, a melt flow rate of 0.5 to 55 g/10 min, and the number of functional groups of 50 or less per $10^6$ main-chain carbon atoms.

In the power storage assembly of the present disclosure, the content of the fluoro(alkyl vinyl ether) unit of the copolymer is preferably 5.5% by mass or lower with respect to the whole of the monomer units.

In the power storage assembly of the present disclosure, the thickness of the gasket is preferably 0.5 to 2.5 mm.

In the power storage assembly of the present disclosure, the sealing area of the gasket is preferably 0.5 to 50 cm$^2$.

In the power storage assembly of the present disclosure, the gasket is preferably in the state of being compressed at a compression deformation rate of 20 to 60%.

In the power storage assembly of the present disclosure, the amount of an electrolytic solution permeation of the copolymer is preferably 0.0055 g/1,000 h or smaller.

In the power storage assembly of the present disclosure, the gasket is preferably an injection molded article or a transfer molded article.

The power storage assembly of the present disclosure preferably has an exterior can, an electric element housed in the exterior can, a lid to close an opening of the exterior can, and an external terminal installed on the lid, and the gasket is held between the lid and the external terminal.

Further according to the present disclosure, there is provided a gasket containing a copolymer containing a tetrafluoroethylene unit and a fluoro(alkyl vinyl ether) unit, wherein the copolymer has a content of the fluoro(alkyl vinyl ether) unit of 2.0 to 4.4% by mass with respect to the whole of the monomer units, a melt flow rate of 0.5 to 50 g/10 min, and the number of functional groups of 50 or less per $10^6$ main-chain carbon atoms.

In the gasket of the present disclosure, the content of the fluoro(alkyl vinyl ether) unit is preferably 4.2% by mass or lower with respect to the whole of the monomer units.

In the gasket of the present disclosure, the melt flow rate is preferably 45 g/10 min or lower.

EXAMPLES

The embodiments of the present disclosure will be described by Examples as follows, but the present disclosure is not limited only to these Examples.

Each numerical value in Examples was measured by the following methods.

(Content of a Monomer Unit)

The content of each monomer unit was measured by an NMR analyzer (for example, manufactured by Bruker Bio-Spin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Number of Functional Groups)

Pellets of the copolymer was molded by cold press into a film of 0.25 to 0.3 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the sample was calculated according to the following formula (A).

$$N = I \times K / t \tag{A}$$

I: absorbance
K: correction factor
t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

[Table 2]

TABLE 2

| Functional Group | Absorption Frequency (cm$^{-1}$) | Molar Extinction Coefficient (l/cm/mol) | Correction Factor | Model Compound |
|---|---|---|---|---|
| —COF | 1888 | 600 | 388 | $C_7F_{15}COF$ |
| —COOH free | 1815 | 530 | 439 | $H(CF_2)_6COOH$ |
| —COOH bonded | 1770 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3348 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

(Melting Point)

The polymer was heated, as a first temperature raising step at a temperature-increasing rate of 10° C./min from 200° C. to 350° C., then cooled at a cooling rate of 10°

C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.

Experimental Example 1

49 L of pure water was charged in a 174 L-volume autoclave; nitrogen replacement was sufficiently carried out; thereafter, 40.7 kg of perfluorocyclobutane, 1.95 kg of perfluoro(propyl vinyl ether) (PPVE) and 3.40 kg of methanol were charged; and the temperature in the system was held at 35° C. and the stirring speed was held at 200 rpm. Then, tetrafluoroethylene (TFE) was introduced under pressure up to 0.64 MPa, and thereafter 0.041 kg of a 50% methanol solution of di-n-propyl peroxydicarbonate was charged to initiate polymerization. Since the pressure in the system decreased along with the progress of the polymerization, TFE was continuously supplied to make the pressure constant, and 0.058 kg of PPVE was added for every 1 kg of TFE supplied and the polymerization was continued for 19 hours. TFE was released to return the pressure in the autoclave to the atmospheric pressure, and thereafter, an obtained reaction product was washed with water and dried to thereby obtain 30 kg of a powder.

The obtained powder was melt extruded at 360° C. by a screw extruder (trade name: PCM46, manufactured by Ikegai Corp.) to thereby obtain pellets of a TFE/PPVE copolymer. The PPVE content of the obtained pellets was measured by the method described above. The result is shown in Table 3.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. By using the fluorinated pellets, the above physical properties were measured by the methods described above. The results are shown in Table 3.

Experimental Example 2

34.0 L of pure water was charged in a 174 L-volume autoclave; nitrogen replacement was sufficiently carried out; thereafter, 30.4 kg of perfluorocyclobutane, 0.73 kg of perfluoro(propyl vinyl ether) (PPVE) and 3.49 kg of methanol were charged; and the temperature in the system was held at 35° C. and the stirring speed was held at 200 rpm. Then, tetrafluoroethylene (TFE) was introduced under pressure up to 0.60 MPa, and thereafter 0.060 kg of a 50% methanol solution of di-n-propyl peroxydicarbonate was charged to initiate polymerization. Since the pressure in the system decreased along with the progress of the polymerization, TFE was continuously supplied to make the pressure constant, and 0.040 kg of PPVE was added for every 1 kg of TFE supplied and the polymerization was continued for 20 hours. TFE was released to return the pressure in the autoclave to the atmospheric pressure, and thereafter, an obtained reaction product was washed with water and dried to thereby obtain 30 kg of a powder.

The obtained powder was melt extruded at 360° C. by a screw extruder (trade name: PCM46, manufactured by Ikegai Corp.) to thereby obtain pellets of a TFE/PPVE copolymer. The PPVE content of the obtained pellets was measured by the method described above. The result is shown in Table 3.

The obtained pellets were put in a vacuum vibration-type reactor VVD-30 (manufactured by Okawara MFG. Co., Ltd.), and heated to 160° C. After vacuumizing, $F_2$ gas diluted to 20% by volume with $N_2$ gas was introduced to the atmospheric pressure. 0.5 hour after the $F_2$ gas introduction, vacuumizing was once carried out and $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 160° C. for 5 hours. After the reaction was finished, the reactor interior was replaced sufficiently by $N_2$ gas to finish the fluorination reaction. By using the fluorinated pellets, the above physical properties were measured by the methods described above. The results are shown in Table 3.

Experimental Example 3

Fluorinated pellets were obtained as in Experimental Example 2, except for changing the charged amount of pure water to 27.0 L, PPVE to 1.20 kg and methanol to 3.00 kg, introducing TFE under pressure to 0.57 MPa, changing the charged amount of the 50% methanol solution of di-n-propyl peroxydicarbonate to 0.014 kg, adding 0.040 kg of PPVE for every 1 kg of TFE supplied, and changing the polymerization time to 21 hours to obtain 30 kg of a powder. The results are shown in Table 3.

Experimental Example 4

Fluorinated pellets were obtained as in Experimental Example 1, except for changing the charged amount of pure water to 26.6 L, perfluorocyclobutane to 30.4 kg, PPVE to 0.77 kg and methanol to 2.40 kg, introducing TFE under pressure to 0.58 MPa, changing the charged amount of the 50% methanol solution of di-n-propyl peroxydicarbonate to 0.011 kg, adding 0.031 kg of PPVE for every 1 kg of TFE supplied, and changing the polymerization time to 9 hours to obtain 15 kg of a powder. The results are shown in Table 3.

Experimental Example 5

Fluorinated pellets were obtained as in Experimental Example 1, except for changing the charged amount of pure water to 26.6 L, perfluorocyclobutane to 30.4 kg, PPVE to 0.77 kg and methanol to 3.30 kg, introducing TFE under pressure to 0.58 MPa, changing the charged amount of the 50% methanol solution of di-n-propyl peroxydicarbonate to 0.011 kg, adding 0.031 kg of PPVE for every 1 kg of TFE supplied, and changing the polymerization time to 10 hours to obtain 15 kg of a powder. The results are shown in Table 3.

Experimental Example 6

Fluorinated pellets were obtained as in Experimental Example 1, except for changing the charged amount of pure water to 26.6 L, perfluorocyclobutane to 30.4 kg, PPVE to 0.77 kg and methanol to 5.10 kg, introducing TFE under pressure to 0.58 MPa, changing the charged amount of the 50% methanol solution of di-n-propyl peroxydicarbonate to 0.011 kg, adding 0.031 kg of PPVE for every 1 kg of TFE supplied, and changing the polymerization time to 11 hours to obtain 15 kg of a powder. The results are shown in Table 3.

Experimental Example 7

Fluorinated pellets were obtained as in Experimental Example 1, except for changing the charged amount of pure water to 26.6 L, perfluorocyclobutane to 30.4 kg, PPVE to 1.02 kg and methanol to 2.05 kg, introducing TFE under pressure to 0.58 MPa, changing the charged amount of the 50% methanol solution of di-n-propyl peroxydicarbonate to 0.015 kg, adding 0.038 kg of PPVE for every 1 kg of TFE supplied, and changing the polymerization time to 8 hours to obtain 15 kg of a powder. The results are shown in Table 3.

Experimental Example 8

Fluorinated pellets were obtained as in Experimental Example 1, except for changing the charged amount of pure water to 26.6 L, perfluorocyclobutane to 30.4 kg, PPVE to 0.92 kg and methanol to 4.00 kg, introducing TFE under pressure to 0.58 MPa, changing the charged amount of the 50% methanol solution of di-n-propyl peroxydicarbonate to 0.021 kg, adding 0.035 kg of PPVE for every 1 kg of TFE supplied, and changing the polymerization time to 8 hours to obtain 15 kg of a powder. The results are shown in Table 3.

Experimental Example 9

Fluorinated pellets were obtained as in Experimental Example 1, except for changing the charged amount of pure water to 34.0 L, perfluorocyclobutane to 30.4 kg, PPVE to 0.61 kg and methanol to 3.74 kg, introducing TFE under pressure to 0.60 MPa, changing the charged amount of the 50% methanol solution of di-n-propyl peroxydicarbonate to 0.060 kg, and adding 0.035 kg of PPVE for every 1 kg of TFE supplied to obtain 30 kg of a powder. The results are shown in Table 3.

Experimental Example 10

Fluorinated pellets were obtained as in Experimental Example 1, except for changing the charged amount of pure water to 26.6 L, perfluorocyclobutane to 30.4 kg, PPVE to 1.16 kg and methanol to 1.71 kg, introducing TFE under pressure to 0.58 MPa, changing the charged amount of the 50% methanol solution of di-n-propyl peroxydicarbonate to 0.044 kg, adding 0.042 kg of PPVE for every 1 kg of TFE supplied, and changing the polymerization time to 8 hours to obtain 15 kg of a powder. The results are shown in Table 3.

Experimental Example 11

Fluorinated pellets were obtained as in Experimental Example 1, except for changing the charged amount of pure water to 34 L, perfluorocyclobutane to 30.4 kg, PPVE to 0.98 kg and methanol to 1.30 kg, introducing TFE under pressure to 0.60 MPa, changing the charged amount of the 50% methanol solution of di-n-propyl peroxydicarbonate to 0.060 kg, adding 0.052 kg of PPVE for every 1 kg of TFE supplied, and changing the polymerization time to 23 hours to obtain 30 kg of a powder. The results are shown in Table 3.

Experimental Example 12

Fluorinated pellets were obtained as in Experimental Example 1, except for changing the charged amount of pure water to 26.6 L, perfluorocyclobutane to 30.4 kg, PPVE to 0.81 kg and methanol to 0.14 kg, introducing TFE under pressure to 0.58 MPa, changing the charged amount of the 50% methanol solution of di-n-propyl peroxydicarbonate to 0.010 kg, adding 0.032 kg of PPVE for every 1 kg of TFE supplied, and changing the polymerization time to 4 hours to obtain 15 kg of a powder. The results are shown in Table 3.

Experimental Example 13

Fluorinated pellets were obtained as in Experimental Example 1, except for changing the charged amount of pure water to 26.6 L, perfluorocyclobutane to 30.4 kg, PPVE to 1.12 kg and methanol to 0.09 kg, introducing TFE under pressure to 0.58 MPa, changing the charged amount of the 50% methanol solution of di-n-propyl peroxydicarbonate to 0.010 kg, adding 0.040 kg of PPVE for every 1 kg of TFE supplied, and changing the polymerization time to 5.5 hours to obtain 15 kg of a powder. The results are shown in Table 3.

Experimental Example 14

Fluorinated pellets were obtained as in Experimental Example 1, except for changing the charged amount of pure water to 26.6 L, perfluorocyclobutane to 30.4 kg, PPVE to 0.77 kg and methanol to 6.40 kg, introducing TFE under pressure to 0.58 MPa, changing the charged amount of the 50% methanol solution of di-n-propyl peroxydicarbonate to 0.011 kg, adding 0.031 kg of PPVE for every 1 kg of TFE supplied, and changing the polymerization time to 12 hours to obtain 15 kg of a powder. The results are shown in Table 3.

Comparative Experimental Example 1

Non-fluorinated pellets were obtained as in Experimental Example 1, except for changing the charged amount of methanol to 3.80 kg to obtain 30 kg of a powder. The results are shown in Table 3.

Comparative Experimental Example 2

Non-fluorinated pellets were obtained as in Experimental Example 1, except for changing the charged amount of pure water to 34 L, perfluorocyclobutane to 30.4 kg, PPVE to 0.73 kg and methanol to 3.84 kg, introducing TFE under pressure to 0.60 MPa, changing the charged amount of the 50% methanol solution of di-n-propyl peroxydicarbonate to 0.060 kg, adding 0.040 kg of PPVE for every 1 kg of TFE supplied, and changing the polymerization time to 20 hours to obtain 30 kg of a powder. The results are shown in Table 3.

Comparative Experimental Example 3

Non-fluorinated pellets were obtained as in Experimental Example 1, except for changing the charged amount of PPVE to 1.38 kg and methanol to 4.00 kg, adding 0.047 kg of PPVE for every 1 kg of TFE supplied, and changing the polymerization time to 18 hours to obtain 30 kg of a powder. The results are shown in Table 3.

Comparative Experimental Example 4

Fluorinated pellets were obtained as in Experimental Example 1, except for changing the charged amount of pure water to 34 L, PPVE to 0.61 kg and methanol to 4.34 kg, introducing TFE under pressure to 0.60 MPa, changing the charged amount of the 50% methanol solution of di-n-propyl peroxydicarbonate to 0.060 kg, adding 0.035 kg of PPVE for every 1 kg of TFE supplied, and changing the polymerization time to 20 hours to obtain 30 kg of a powder. The results are shown in Table 3.

Comparative Experimental Example 5

Fluorinated pellets were obtained as in Experimental Example 1, except for changing the charged amount of pure water to 34 L, perfluorocyclobutane to 30.4 kg, PPVE to 0.78 kg and methanol to 4.70 kg, introducing TFE under pressure to 0.60 MPa, changing the charged amount of the 50% methanol solution of di-n-propyl peroxydicarbonate to 0.060 kg, adding 0.043 kg of PPVE for every 1 kg of TFE supplied, and changing the polymerization time to 23 hours to obtain 30 kg of a powder. The results are shown in Table 3.

Comparative Experimental Example 6

Fluorinated pellets were obtained as in Experimental Example 1, except for changing the charged amount of PPVE to 2.29 kg and methanol to 3.30 kg, adding 0.065 kg of PPVE for every 1 kg of TFE supplied, and changing the polymerization time to 19 hours to obtain 30 kg of a powder. The results are shown in Table 3.

Comparative Experimental Example 7

Fluorinated pellets were obtained as in Experimental Example 1, except for changing the charged amount of PPVE to 3.15 kg and methanol to 3.30 kg, adding 0.082 kg of PPVE for every 1 kg of TFE supplied, and changing the polymerization time to 20 hours to obtain 30 kg of a powder. The results are shown in Table 3.

Comparative Experimental Example 8

Non-fluorinated pellets were obtained as in Experimental Example 1, except for changing the charged amount of pure water to 26.6 L, perfluorocyclobutane to 30.4 kg, PPVE to 1.12 kg, adding no methanol, introducing TFE under pressure to 0.58 MPa, changing the charged amount of the 50% methanol solution of di-n-propyl peroxydicarbonate to 0.010 kg, adding 0.040 kg of PPVE for every 1 kg of TFE supplied, and changing the polymerization time to 4 hours to obtain 15 kg of a powder. The results are shown in Table 3.

Comparative Experimental Example 9

Non-fluorinated pellets were obtained as in Experimental Example 1, except for changing the charged amount of pure water to 53.8 L, perfluorocyclobutane to 41.7 kg, PPVE to 0.31 kg and methanol to 1.73 kg, introducing TFE under pressure to 0.50 MPa, changing the charged amount of the 50% methanol solution of di-n-propyl peroxydicarbonate to 0.220 kg, adding 0.016 kg of PPVE for every 1 kg of TFE supplied, and changing the polymerization time to 7 hours to obtain 30 kg of a powder. The results are shown in Table 3.

[Table 3]

degree of corrosion of the surface of the metal post was visually observed. The degree of corrosion was judged based on the following criteria.

Good: no corrosion observed.

Fair: corrosion slightly observed

Poor: corrosion observed.

(Electrolytic Solution Immersion Test)

Approximately 5 g of the pellets was charged in a metal mold (inner diameter: 120 mm, height: 38 mm), and melted by hot plate press at 370° C. for 20 min, thereafter, water-cooled with a pressure of 1 MPa (resin pressure) to thereby prepare a molded article of approximately 0.2 mm in thickness. Thereafter, by using the obtained molded article, test pieces of 15-mm square were prepared.

10 sheets of the obtained test pieces and 2 g of an electrolytic solution (dimethyl carbonate (DMC)) were put in a 20-mL glass sample bottle, and the cap of the sample bottle was closed. The sample bottle was put in a thermostatic chamber at 80° C., and allowed to stand for 144 hours to thereby immerse the test pieces in the electrolytic solution. Thereafter, the sample bottle was taken out from the thermostatic chamber, and cooled to room temperature; then, the test pieces were taken out from the sample bottle. The electrolytic solution remaining after the test pieces taken out was allowed to be air-dried in the sample bottle put in a room controlled to be a temperature of 25° C. for 24 hours; and 2 g of ultrapure water was added. The obtained aqueous solution was transferred to a measuring cell of an

TABLE 3

| | PPVE content (wt %) | MFR (g/10 min) | Number of Functional groups (number/C10⁸) | Melting point (° C.) |
|---|---|---|---|---|
| Experimental Example 1 | 5.5 | 26.0 | less than 6 | 302 |
| Experimental Example 2 | 3.9 | 48.3 | 49 | 305 |
| Experimental Example 3 | 4.4 | 29.0 | 42 | 304 |
| Experimental Example 4 | 3.0 | 13.3 | less than 6 | 310 |
| Experimental Example 5 | 3.0 | 17.2 | less than 6 | 310 |
| Experimental Example 6 | 3.0 | 29.0 | less than 6 | 310 |
| Experimental Example 7 | 3.6 | 12.1 | less than 6 | 307 |
| Experimental Example 8 | 3.4 | 27.4 | less than 6 | 309 |
| Experimental Example 9 | 3.4 | 50.0 | less than 6 | 309 |
| Experimental Example 10 | 4.0 | 13.0 | less than 6 | 305 |
| Experimental Example 11 | 4.9 | 30.4 | less than 6 | 302 |
| Experimental Example 12 | 3.1 | 2.2 | less than 6 | 310 |
| Experimental Example 13 | 3.9 | 1.9 | less than 6 | 305 |
| Experimental Example 14 | 3.0 | 41.9 | less than 6 | 310 |
| Comparative Experimental Example 1 | 5.5 | 26.0 | 289 | 302 |
| Comparative Experimental Example 2 | 3.9 | 48.3 | 344 | 305 |
| Comparative Experimental Example 3 | 4.5 | 26.0 | 289 | 304 |
| Comparative Experimental Example 4 | 3.4 | 60.4 | less than 6 | 306 |
| Comparative Experimental Example 5 | 4.1 | 72.0 | less than 6 | 304 |
| Comparative Experimental Example 6 | 6.1 | 25.0 | less than 6 | 302 |
| Comparative Experimental Example 7 | 7.6 | 29.0 | less than 6 | 293 |
| Comparative Experimental Example 8 | 3.9 | 0.1 | (*1) | 305 |
| Comparative Experimental Example 9 | 1.6 | 31.0 | 304 | 317 |

(*1) no test film could be prepared and no measurement could be carried out.

Then, by using the obtained pellets, the following properties were evaluated. The results are shown in Table 4.

(Metal Corrosion Test)

20 g of the pellets was put in a glass container (50-ml screw vial); and a metal post (5-mm square shape, length of 30 mm) formed of HPM38 (Cr-plated) or HPM38 (Ni-plated) was hung in the glass container so as not to be in contact with the pellets. Then, the glass container was covered with a lid made of an aluminum foil. The glass container was put in an oven as is and heated at 380° C. for 3 hours. Thereafter, the heated glass container was taken out from the oven, and cooled to room temperature; and the ion chromatosystem; and the amount of fluorine ions in the aqueous solution was measured by an ion chromatograph system (manufactured by Thermo Fisher Scientific Inc., Dionex ICS-2100).

(Compression Set Rate (CS))

The measurement of the compression set rate was carried out according to the method described in ASTM D395 or JIS K6262.

Approximately 2 g of the pellets was charged in a metal mold (inner diameter: 13 mm, height: 38 mm), and melted by hot plate press at 370° C. for 30 min, thereafter, water-cooled with a pressure of 0.2 MPa (resin pressure) to thereby prepare a molded article of approximately 8 mm in height. Thereafter, by cutting the obtained molded article, a test piece of 13 mm in outer diameter and 6 mm in height was prepared. The prepared test piece was compressed to a compression deformation rate of 50% (that is, the test piece of 6 mm in height was compressed to a height of 3 mm) at normal temperature by using a compression device.

Then, the compressed test piece being fixed on the compression device was allowed to stand still in an electric furnace at 65° C. for 72 hours. The compression device was taken out from the electric furnace, and cooled to room temperature; thereafter, the test piece was dismounted. The collected test piece was allowed to stand at room temperature for 30 min; thereafter, the height of the collected test piece was measured and the compression set rate was determined by the following formula.

$$\text{Compression set rate (\%)} = (t_0 - t_2)/(t_0 - t_1) \times 100$$

$t_0$: an original height of the test piece (mm)

$t_1$: a height of a spacer (mm)

$t_2$: a height of the test piece dismounted from the compression device (mm)

In the above test, $t_0$ was 6 mm and $t_1$ was 3 mm.

(Compression Set Test)

Test pieces were prepared as mentioned in the measurement of the compression set rate. The prepared test piece was compressed to a compression deformation rate of 50% (that is, the test piece of 6 mm in height was compressed to a height of 3 mm) at a normal temperature by using a compression device. The compressed test piece fixed on the compression device was allowed to stand still in an electric furnace at 150° C. for 18 hours. The compression device was taken out from the electric furnace, and cooled to room temperature; thereafter, the test piece was dismounted. The collected test piece was allowed to stand at room temperature for 30 min; thereafter, the collected test piece was observed and evaluated based on the following criteria.

Absent: no cracks were observed on the test piece.

Present: cracks were observed on the test piece.

The height of the collected test piece was measured and the amount of recovery was determined by the following formula.

$$\text{Amount of recovery (mm)} = t_2 - t_1$$

$t_1$: a height of a spacer (mm)

$t_2$: a height of the test piece dismounted from the compression device (mm)

In the above test, $t_1$ was 3 mm.

(Storage Elastic Modulus at 150° C. (E'))

The storage elastic modulus was determined by carrying out dynamic viscoelasticity measurement using a DVA-220 (manufactured by IT Keisoku Seigyo K.K.). A compression molded sheet of 25 mm in length, 5 mm in width and 0.2 mm in thickness was used as a sample test piece, the measurement was carried out under the condition of a temperature-increasing rate of 2° C./min, a frequency of 10 Hz, and in the range of 30° C. to 250° C., and the storage elastic modulus (MPa) at 150° C. was identified.

(Surface Pressure at 150° C.)

The surface pressure at 150° C. was determined from the result of the compression set test at 150° C. and the result of the storage elastic modulus measurement at 150° C. by the following formula.

$$\text{Surface pressure at 150° C. (MPa)}: (t_2 - t_1)/t_1 \times E'$$

$t_1$: the height of the spacer $t_2$: the height of the test piece dismounted from the compression device $E'$: the storage elastic modulus at 150° C. (MPa)

(Electrolytic Solution Permeation Test)

The copolymer was injection molded by using an injection molding machine (manufactured by Sumitomo Heavy Industries, Ltd., SE50EV-A) at a cylinder temperature of 350 to 385° C. and at a metal mold temperature of 150 to 220° C. to thereby obtain a gasket of ϕ17.7 mm in outer diameter, ϕ14.3 mm in inner diameter and 1.6 mmt in thickness.

Since injection molding of the copolymers of Experimental Examples 12 and 13 was difficult and gaskets could not be prepared by injection molding these copolymers, gaskets were prepared by the following method. Pellets of the copolymer was charged in a metal mold (300 mm×300 mm) and preheated in an electric furnace at 350° C. for 1 hour, and thereafter pressurized at 1 MPaG for 1 min to prepare a sheet of 300 mm×300 mm and 25 mm in thickness, which was then allowed to cool to room temperature to thereby obtain a sample sheet (in Table 4, described as "HP" (heat press)). The sample sheet was cut into ϕ17.7 mm in outer diameter, ϕ14.3 mm in inner diameter and 1.6 mmt in thickness to thereby obtain a gasket.

Figure 5:
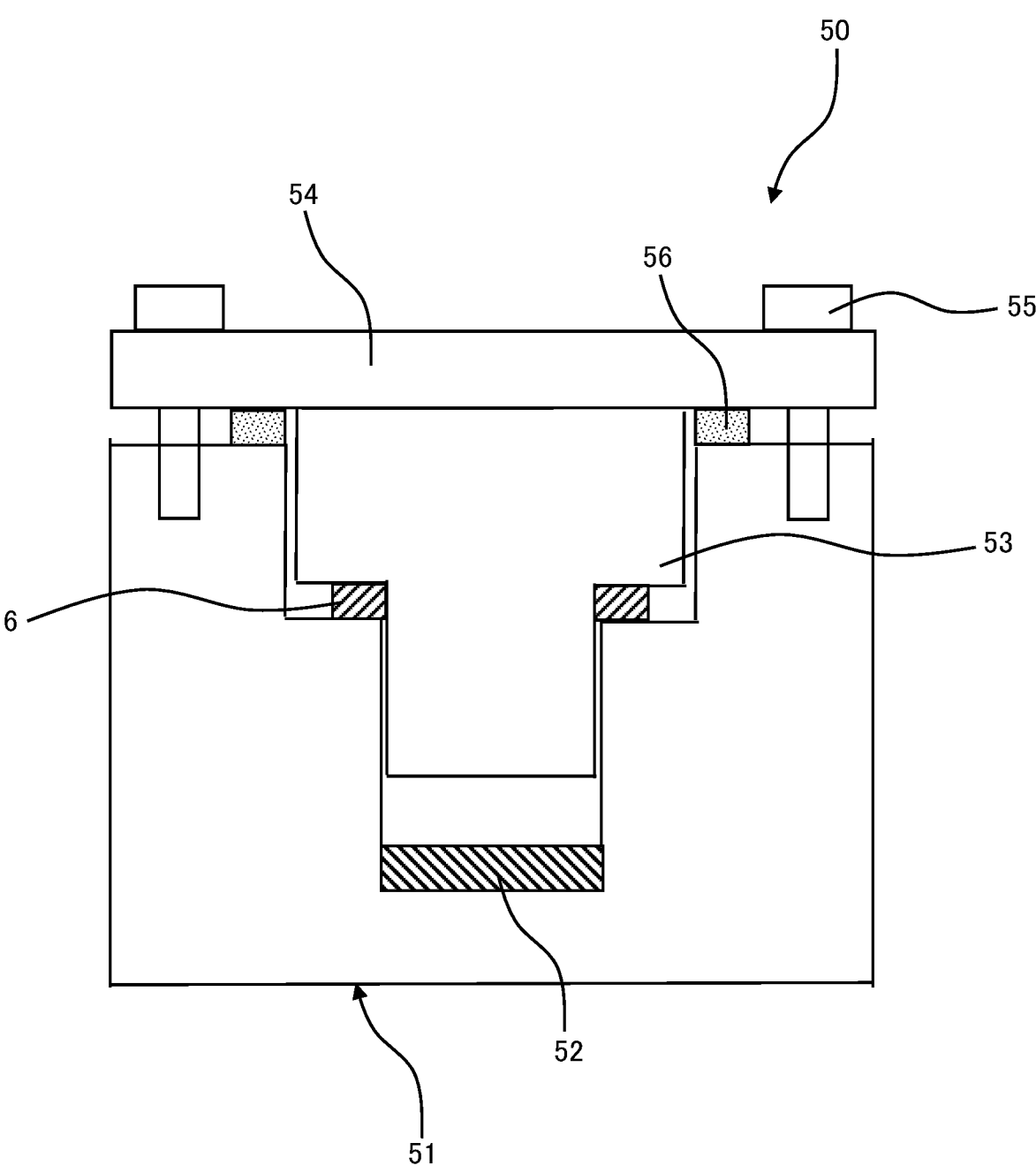
FIG. 5 is a schematic cross-sectional view of a permeation test jig used in an electrolytic solution permeation test.

As illustrated in FIG. 5, 2 g of an electrolytic solution 52 was put in an aluminum alloy cup 51. The electrolytic solution contained ethylene carbonate (EC) and diethyl carbonate (DEC) wherein the volume ratio (EC/DEC) of EC and DEC was 30/70 (% by volume). A gasket 6 was assembled between the cup 51 and a gasket compression jig 53; the lid 54 was fastened with bolts 55 to compress the gasket 6. A spacer 56 was disposed between the lid 54 and the cup 51 and the compression deformation rate of the gasket 6 was adjusted to 50%. The mass of a permeation test jig 50 thus obtained was measured. The permeation test jig 50 was charged in a thermostatic chamber heated at 60° C., and after 1,000 hours of being allowed to stand therein, taken out and allowed to stand at room temperature for 2 hours; thereafter, the mass was measured. The amount of the electrolytic solution permeation was determined by the following formula. This operation was five times repeated and the average value of the amounts of the electrolytic solution permeation was determined. In Table 4, the average values are described.

$$\text{Amount of the electrolytic solution permeation (g/1,000 h)} = \text{(a mass of the permeation test jig before being heated)} - \text{(a mass of the permeation test jig after being heated)}$$

(Injection Moldability)

The gasket prepared in the electrolytic solution permeation test was visually observed and the injection moldability was evaluated based on the following criteria.

Good: no burrs were observed on the gasket.

Fair: small burrs having an area of 1 mm² or smaller were observed on the gasket.

Poor: large burrs having an area exceeding 1 mm² were observed on the gasket.

[Table 4]

TABLE 4

| | Metal corrosion test | | Electrolyte solution immersion test Amount of fluorine ions dissolving out | Com-pression | Com-pression | Recovered | E' | Surface pressure | Gasket | Electrolyte solution permeation test Amount of electrolytic solution | |
|---|---|---|---|---|---|---|---|---|---|---|---|
| | HPM38 (Cr-plated) | HPM38 (Ni-plated) | (ppm by mass) | set rate 65° C. (%) | set test 150° C. | amount (mm) | 150° C. (MPa) | 150° C. (MPa) | preparing method | permeation (g/1000 hrs) | Injection moldability |
| Experimental Example 1 | Good | Good | 0.6 | 85 | absent | 0.011 | 86 | 0.32 | injection molding | 0.0052 | Good |
| Experimental Example 2 | Good | Good | 0.8 | 86 | absent | 0.008 | 135 | 0.38 | injection molding | 0.0052 | Good |
| Experimental Example 3 | Good | Good | 0.7 | 85 | absent | 0.016 | 110 | 0.59 | injection molding | 0.0048 | Good |
| Experimental Example 4 | Good | Good | 0.6 | 82 | absent | 0.035 | 130 | 1.52 | injection molding | 0.0033 | Good |
| Experimental Example 5 | Good | Good | 0.6 | 83 | absent | 0.032 | 135 | 1.44 | injection molding | 0.0035 | Good |
| Experimental Example 6 | Good | Good | 0.6 | 84 | absent | 0.025 | 143 | 1.15 | injection molding | 0.0037 | Good |
| Experimental Example 7 | Good | Good | 0.6 | 83 | absent | 0.030 | 120 | 1.20 | injection molding | 0.0036 | Good |
| Experimental Example 8 | Good | Good | 0.6 | 84 | absent | 0.023 | 138 | 1.04 | injection molding | 0.0040 | Good |
| Experimental Example 9 | Good | Good | 0.7 | 86 | absent | 0.012 | 143 | 0.57 | injection molding | 0.0049 | Good |
| Experimental Example 10 | Good | Good | 0.6 | 81 | absent | 0.030 | 115 | 1.15 | injection molding | 0.0040 | Good |
| Experimental Example 11 | Good | Good | 0.6 | 85 | absent | 0.010 | 85 | 0.32 | injection molding | 0.0052 | Good |
| Experimental Example 12 | Good | Good | 0.6 | 76 | absent | 0.040 | 105 | 1.40 | HP & cutting | 0.0030 | non-moldable |
| Experimental Example 13 | Good | Good | 0.6 | 77 | absent | 0.040 | 85 | 0.94 | HP & cutting | 0.0037 | non-moldable |
| Experimental Example 14 | Good | Good | 0.7 | 86 | absent | 0.015 | 150 | 0.90 | injection molding | 0.0042 | Good |
| Comparative Experimental Example 1 | Poor | Poor | 1.6 | 86 | absent | 0.010 | 85 | 0.28 | injection molding | 0.0060 | Good |
| Comparative Experimental Example 2 | Poor | Poor | 1.7 | 87 | absent | 0.006 | 135 | 0.27 | injection molding | 0.0060 | Good |
| Comparative Experimental Example 3 | Poor | Poor | 1.6 | 86 | absent | 0.013 | 108 | 0.47 | injection molding | 0.0057 | Good |
| Comparative Experimental Example 4 | Good | Good | 0.7 | 87 | present | — | 145 | — | injection molding | 0.0057 | Good |
| Comparative Experimental Example 5 | Good | Good | 0.7 | 89 | present | — | 140 | — | injection molding | 0.0058 | Good |
| Comparative Experimental Example 6 | Good | Good | 0.6 | 80 | absent | 0.009 | 83 | 0.25 | injection molding | 0.0058 | Good |
| Comparative Experimental Example 7 | Good | Good | 0.6 | 90 | absent | 0.004 | 62 | 0.05 | injection molding | 0.0068 | Good |
| Comparative Experimental Example 8 | — | — | — | — | — | — | — | — | — | — | — |
| Comparative Experimental Example 9 | Good | Good | 1.6 | cracking | present | — | — | — | injection molding | (*2) | Good |

(*2) no electrolyte solution permeation test was carried out because generation of cracks during the test could be presupposed.

REFERENCE SIGNS LIST

10 POWER STORAGE ASSEMBLY
1 EXTERIOR CAN
2 LID
3 BOTTOM FACE
4A FIRST EXTERNAL TERMINAL
4B SECOND EXTERNAL TERMINAL
5 PLUG
6 GASKET
    61 CYLINDRICAL PART
    62 FLANGE PART
    63 SIDE WALL PART
7 INSULATING MEMBER
50 PERMEATION TEST JIG

What is claimed is:

1. A nonaqueous electrolyte battery comprising a gasket containing a copolymer containing a tetrafluoroethylene unit and a perfluoro(propyl vinyl ether) unit, wherein the copolymer has a content of the perfluoro(propyl vinyl ether) unit of 2.0 to 6.0% by mass with respect to the whole of the monomer units, a melt flow rate of 0.5 to 55 g/10 min, and the number of functional groups of 50 or less per $10^6$ main-chain carbon atoms.

2. The nonaqueous electrolyte battery according to claim 1, wherein the content of the perfluoro(propyl vinyl ether) unit of the copolymer is 2.0 to 5.5% by mass with respect to the whole of the monomer units.

3. The nonaqueous electrolyte battery according to claim 1, wherein the gasket has a thickness of 0.5 to 2.5 mm.

4. The nonaqueous electrolyte battery according to claim 1, wherein the gasket has a sealing area of 0.5 to 50 cm$^2$.

5. The nonaqueous electrolyte battery according to claim 1, wherein the gasket is in a state of being compressed at a compression deformation rate of 20 to 60%.

6. The nonaqueous electrolyte battery according to claim 1, wherein an amount of an electrolytic solution permeation of the copolymer is 0.0055 g/1,000 h or smaller.

7. The nonaqueous electrolyte battery according to claim 1, wherein the gasket is an injection molded article or a transfer molded article.

8. The nonaqueous electrolyte battery according to claim 1, the nonaqueous electrolyte battery comprising:
an exterior can;
an electric element housed in the exterior can;
a lid to close an opening of the exterior can; and
an external terminal installed on the lid,
wherein the gasket is held between the lid and the external terminal.

9. The nonaqueous electrolyte battery according to claim 1, wherein the melt flow rate of the copolymer is 5 to 55 g/10 min.

10. The nonaqueous electrolyte battery according to claim 1, wherein the melt flow rate of the copolymer is 10 to 55 g/10 min.

11. A method for sealing a nonaqueous electrolyte battery, the nonaqueous electrolyte battery comprising an exterior can, an electric element housed in the exterior can, a lid to close an opening of the exterior can, and an external terminal installed on the lid, the method comprising:
disposing the gasket between the external terminal and the lid to prevent leakage and diffusion of an electrolytic solution to an outside of the nonaqueous electrolyte battery,
wherein the gasket comprises a copolymer containing a tetrafluoroethylene unit and a perfluoro(propyl vinyl ether) unit, wherein the copolymer has a content of the perfluoro(propyl vinyl ether) unit of 2.0 to 6.0% by mass with respect to the whole of the monomer units, a melt flow rate of 0.5 to 55 g/10 min, and the number of functional groups of 50 or less per $10^6$ main-chain carbon atoms.

12. The method according to claim 11, wherein the melt flow rate of the copolymer is 5 to 55 g/10 min.

13. The method according to claim 11, wherein the melt flow rate of the copolymer is 10 to 55 g/10 min.

\* \* \* \* \*